(12) United States Patent
Miyashita

(10) Patent No.: US 7,245,425 B2
(45) Date of Patent: Jul. 17, 2007

(54) MICROSCOPE OPTICAL SYSTEM AND MICROSCOPE OBJECTIVE LENS

(75) Inventor: Tomohiro Miyashita, Kamakura (JP)

(73) Assignee: Nikon Corporation, Tokyo (JP)

( * ) Notice: Subject to any disclaimer, the term of this patent is extended or adjusted under 35 U.S.C. 154(b) by 1 day.

(21) Appl. No.: 10/721,994

(22) Filed: Nov. 26, 2003

(65) Prior Publication Data

US 2004/0105164 A1    Jun. 3, 2004

(30) Foreign Application Priority Data

| Nov. 28, 2002 | (JP) | ............................. 2002-345967 |
| Sep. 29, 2003 | (JP) | ............................. 2003-338495 |
| Oct. 20, 2003 | (JP) | ............................. 2003-359465 |

(51) Int. Cl.
*G02B 21/00* (2006.01)

(52) U.S. Cl. ...................... 359/384; 359/380; 359/381

(58) Field of Classification Search ................ 359/380, 359/368, 381, 384
See application file for complete search history.

(56) References Cited

U.S. PATENT DOCUMENTS

| 5,424,803 | A | * | 6/1995 | Noguchi ....................... 355/53 |
| 6,128,128 | A | * | 10/2000 | Otaki et al. .................. 359/381 |
| 6,188,514 | B1 | * | 2/2001 | Saito et al. ................... 359/381 |
| 6,320,702 | B1 | | 11/2001 | Yonezawa .................... 359/686 |
| 2001/0040723 | A1 | * | 11/2001 | Kusaka ........................ 359/370 |
| 2003/0123145 | A1 | * | 7/2003 | Kaneko et al. .............. 359/390 |

FOREIGN PATENT DOCUMENTS

| JP | 09-033818 | 2/1997 |
| JP | 2000-171721 | 6/2000 |
| JP | 2001-166215 | 6/2001 |

* cited by examiner

*Primary Examiner*—Thong Nguyen
*Assistant Examiner*—Joshua L. Pritchett
(74) *Attorney, Agent, or Firm*—Miles & Stockbridge PC

(57) ABSTRACT

A microscope optical system comprises an objective lens and an intermediate magnification varying part disposed just after the image side of the objective lens. A microscope objective lens according to another aspect of the invention comprises a first lens group and a second lens group in the mentioned order from the object side. The first lens group includes a positive meniscus lens with the concave surface facing the object side and one or more cemented lenses, the first lens group having a positive refractive power as a whole, at least one of the cemented lenses includes a lens made of a material having an Abbe's number equal to or larger than 80, and conditions $0.3 \leq wd/f \leq 0.45$ and $0.6 \leq NA$ are satisfied, where f represents the focal length of the microscope objective lens as a whole, wd represents the working distance of the microscope objective lens, and NA represents the numerical aperture of the microscope objective lens.

13 Claims, 17 Drawing Sheets

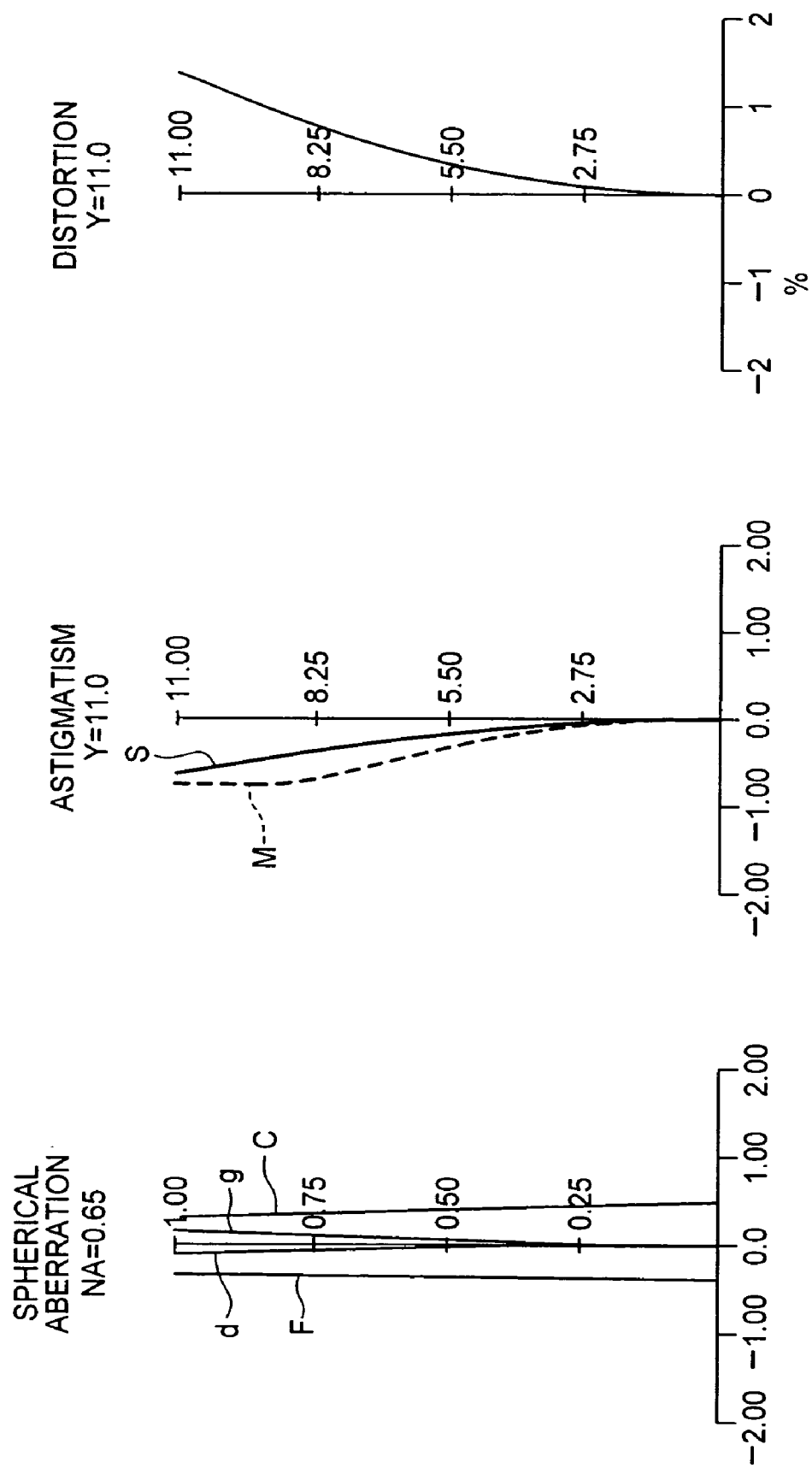

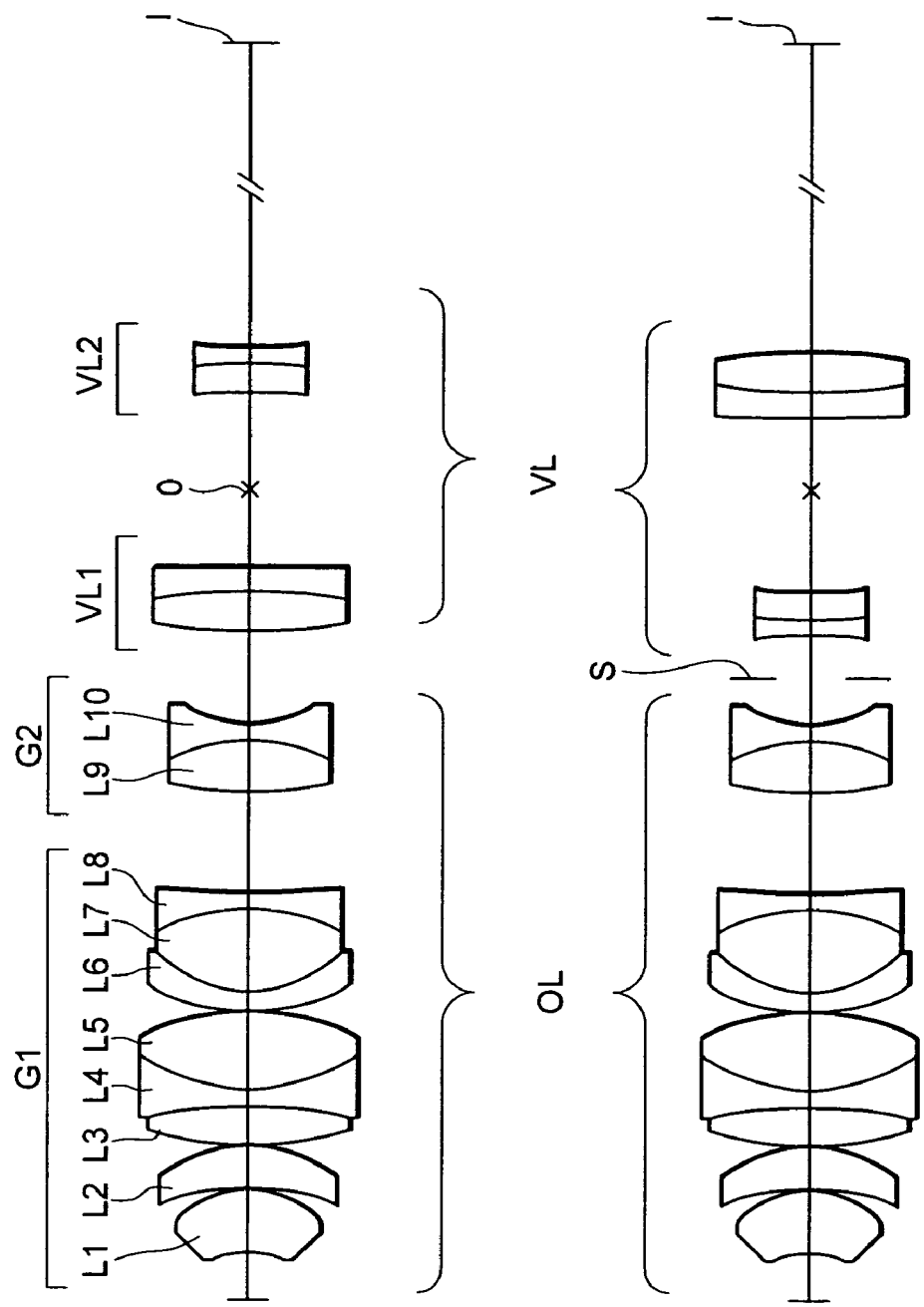

MICROSCOPE OPTICAL SYSTEM AND MICROSCOPE OBJECTIVE LENS

This application claims the benefit of Japanese Patent applications No. 2002-345967, No. 2003-338495, and No. 2003-359465 which are hereby incorporated by reference.

BACKGROUND OF THE INVENTION

1. Field of the Invention

The present invention relates to a microscope optical system, and particularly relates to a microscope optical system provided with an intermediate magnification varying part and a microscope objective lens.

2. Related Background Art

When cells of an organism, for example, are to be observed, a general process is that a stage is moved under a relatively large field of view at a low magnification so that an object to be observed such as a cancer cell is brought into the field of view and then the magnification is changed to a high magnification so that the object can be observed closely. In the case of examination of cancer cells, cytological examination is generally performed, in which cells or blood sampled from a patient is observed by a microscope. In the cytological examination, observation is performed firstly with a relatively large field of view using a microscope objective lens with a magnification of 10× while moving a stage, and if a cell suspected as a cancer cell or the like is discovered, the magnification of the microscope objective lens is switched to 40× for observation with a high resolution. In cytological examination, microscope objective lenses with magnifications of 10× and 40× are typically switched and used.

Such magnification switching is generally performed by switching objective lenses. In the case that objective lenses are switched, an eccentricity in the barrel and a displacement of a focal point position occur in the switching process. Therefore, it is necessary to allow adjustment of those factors by adding an adjusting mechanism in the revolver or by moving the stage.

In addition, in cytological examination, an operation called marking is performed, that is an operation of putting a mark on the cover glass at a position near a suspicious cell.

In order to eliminate need for the above-described adjustment operations or to simplify those operations, a process of changing the observation magnification by operating a magnification varying portion provided on an arm of a microscope has been proposed, for example in Japanese Patent Application Laid-Open No. 2001-166215.

Furthermore, in Japanese Patent Application Laid-Open No. 9-33818, there is proposed to change the magnification by a magnification varying apparatus without switching the microscope objective lens. In that case, it is preferable that a microscope objective lens with a magnification of 20× or so be used. However, the numerical apertures of microscope objective lenses with a magnification of 20× or so are generally equal to or smaller than 0.5.

The methods of varying magnification disclosed in the aforementioned prior arts suffer from a problem that in the case that an enlarging magnification varying system is used in combination with an objective lens with a relatively low magnification, high resolution observation is not possible due to the smallness in the numerical aperture of the objective lens. On the other hand, in the case that a reducing magnification varying system is used in combination with an objective lens with a relatively high magnification, there is another problem that aberrations at the periphery of the field of view is deteriorated. In order to eliminate the aforementioned problems, the optical system arrangement in which an image is once formed by the light from the objective lens and then the image is enlarged by the magnification varying part has been adopted. However, in the case that an intermediate magnification varying apparatus is used in combination with a microscope, the eye point will be made high and the size of the apparatus will be increased, so that fatigue of the observer tends to be increased when observation is performed for a long period of time. In addition, in that case, the distance between the objective lens and the imaging lens becomes large and the light quantity in the image periphery will be decreased, so that there is a risk that vignetting can occur.

In addition, in the case that an objective lens with a high magnification is used, there is another problem that the marking operation is not easy since the working distance becomes small.

SUMMARY OF THE INVENTION

A first object of the present invention is to provide a microscope optical system in which eccentricity in the barrel and displacement of a focal point position due to switching the objective lenses do not occur upon changing the observation magnification to allow observation of an image with good image quality with the magnification ranging from a relatively low magnification to a relatively high magnification.

In order to attain the aforementioned first object, according to the first invention, there is provided a microscope optical system comprising an objective lens and an intermediate magnification varying part disposed just after the image side of the objective lens.

In the microscope optical system according to the first invention, it is preferable that the intermediate magnification varying portion include a lens group having a positive refractive power and a lens group having a negative refractive power so that in a high magnification variation state, the lens group having a positive refractive power be disposed, just after the image side of the objective lens, while in a low magnification variation state, the lens group having a negative refractive power be disposed just after the image side of the objective lens.

In the microscope optical system according to the first invention, it is preferable that the intermediate magnification varying part be constructed in such a way that its optical system is rotatable with an axis substantially orthogonal to the optical axis being a rotation axis.

In the microscope optical system according to the first invention, it is preferable that the magnification in the high magnification variation state be $\alpha$ while the magnification in the low magnification variation state be $1/\alpha$.

In the microscope optical system according to the first invention, it is preferable that the aforementioned magnification $\alpha$ satisfies $1.25 \leq \alpha \leq 2.5$.

It is preferable that the microscope optical system according to the first invention be provided with a connecting portion on the image side of the intermediate magnification varying part and the microscope optical system can be connected with a body of a microscope by means of the connecting portion.

According to the first invention, an intermediate magnification varying part is provided just after the image side of the objective lens to allow changing of the observation magnification without exchanging the objective lens. Thus, the first invention can provide a microscope optical system in which eccentricity in the barrel and displacement of a focal point position due to switching the objective lenses do not occur upon changing the observation magnification to allow observation of an image with good image quality with the magnification ranging from a relatively low magnification to a relatively high magnification.

A second object of the invention is to provide a microscope objective lens as an infinity optical system having a large numerical aperture equal to or larger than 0.6 and allowing a large working distance.

In order to attain the aforementioned second object, according to the second invention, there is provided a microscope objective lens comprising, in the following order from the object side, a first lens group and a second lens group, wherein:

the first lens group includes a positive meniscus lens with the concave surface facing the object side and one or more cemented lenses, and has a positive refractive power as a whole;

at least one of the cemented lenses includes a lens made of a material having an Abbe's number equal to or larger than 80; and the following conditions are satisfied:

$$0.3 \leq wd/f \leq 0.45$$

$$0.6 \leq NA$$

where, f represents the focal length of the microscope objective lens as a whole, wd represents the working distance of the microscope objective lens, and NA represents the numerical aperture of the microscope objective lens.

It is preferable that the microscope objective lens according to the second invention have a magnification of 20×.

In the microscope objective lens according to the second invention, it is preferable that at least one of the cemented lenses be a cemented lens composed of three lens elements.

In the microscope objective lens according to the second invention, it is preferable that the lens made of a material having an Abbe's number equal to or larger than 80 be made of fluorite.

As per the above, according to the second invention, it is possible to provide a microscope objective lens as an infinity optical system having a large numerical aperture equal to or larger than 0.6 and allowing a large working distance.

BRIEF DESCRIPTION OF THE DRAWINGS

FIGS. 1A and 1B are diagrams showing the lens configuration of a microscope lens system according to a first embodiment of the present invention, wherein FIG. 1A shows the system in the high magnification variation state (2×) and FIG. 1B shows the system in the low magnification variation state (0.5×).

FIG. 3 shows various aberration curves of the microscope optical system according to the first embodiment in the low magnification variation state (0.5×)

FIGS. 4A and 4B are diagrams showing the lens configuration of a microscope lens system according to a second embodiment of the present invention, wherein FIG. 4A shows the system in the high magnification variation state (1.25×) and FIG. 4B shows the system in the low magnification variation state (0.8×).

FIGS. 5A and 5B are diagrams showing the lens configuration of a microscope lens system according to a third embodiment of the present invention, wherein FIG. 5A shows the system in the high magnification variation state (1.5×) and FIG. 5B shows the system in the low magnification variation state (0.66×).

FIGS. 6A and 6B are diagrams showing the lens configuration of a microscope lens system according to a fourth embodiment of the present invention, wherein FIG. 6A shows the system in the high magnification variation state (2×) and FIG. 6B shows the system in the low magnification variation state (0.5×)

FIGS. 7A and 7B are diagrams showing the lens configuration of a microscope lens system according to a fifth embodiment of the present invention, wherein FIG. 7A shows the system in the high magnification variation state (2×) and FIG. 7B shows the system in the low magnification variation state (0.5×).

FIGS. 8A and 8B are diagrams showing the lens configuration of a microscope lens system according to a sixth embodiment of the present invention, wherein FIG. 8A shows the system in the high magnification variation state. (2×) and FIG. 8B shows the system in the low magnification variation state (0.5×)

DESCRIPTION OF THE PREFERRED EMBODIMENTS

Figure 1:
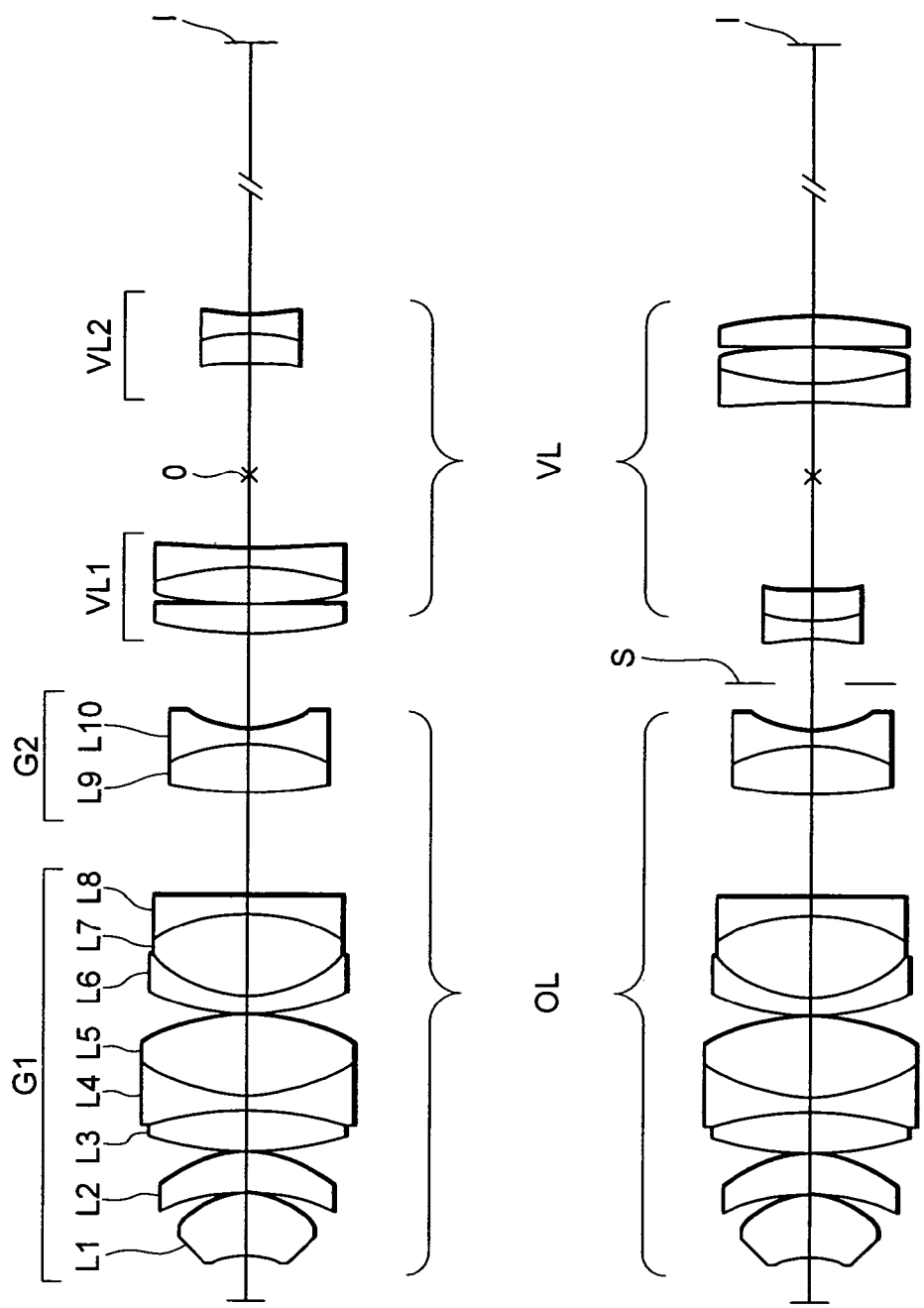

In the following, embodiments of the present invention will be described with reference to the accompanying drawings.

Embodiments of the microscope optical system according to a first aspect of the present invention will be described in the following.

In an embodiment according to the first aspect of the present invention, the microscope optical system is composed of an objective lens OL and an intermediate magnification varying part VL disposed just after the image side of the objective lens OL.

The objective lens OL includes a first lens group G1 and a second lens group G2 in the mentioned order from the object side. The first lens group G1 includes a positive meniscus lens L1 with the concave side facing the object side and one or more cemented lenses (i.e. at least one cemented lens). The first lens group G1 has a positive refracting power as a whole. At least one of the cemented lenses includes a positive lens having a double convex shape made of a material having an Abbe's number equal to or larger than 80. In addition, the objective lens OL satisfies the following conditional expressions:

$$0.3 \leq wd/f \leq 0.45, \text{ and} \quad (1)$$

$$0.6 \leq NA, \quad (2)$$

where f represents the focal length of the objective lens OL, wd represents the working distance of the objective lens OL, and NA represents the numerical aperture of the objective lens OL.

In the objective lens of the microscope optical system according to the first aspect of the present invention, the lens surface closest to the object is designed to be concave so that the Petzval sum is made small. Thus, planarity of the image will be ensured.

The above-mentioned conditional expression (1) is a condition for defining the working distance wd of the objective lens OL. Values lower than the lower limit value of that conditional expression are not preferable, since with such values the distance between the objective lens OL and the specimen becomes too short and operationality will be deteriorated. Values larger than the upper limit value of that conditional expression are not preferable, since with such values planarity of the image and chromatic aberration will be deteriorated.

Conditional expression (2) is a condition for determining the numerical aperture NA of the objective lens OL. If the numerical aperture NA is smaller than 0.6, desired resolving powers cannot be obtained.

As a material having an Abbe's number equal to or larger than 80 for a cemented lens, fluorite is used. A lens made of a material having an Abbe's number smaller than 80 is not preferable since the chromatic aberration will be deteriorated.

The intermediate magnification varying part VL includes a lens group VL1 having a positive refractive power and a lens group VL2 having a negative refractive power. In the high magnification variation state, the lens group VL1 having a positive refractive power is disposed adjacent to the image side of the objective lens OL and the lens group VL2 is disposed on the image plane side, so that the synthesized magnification of the microscope optical system is determined as the product of the magnification β of the objective lens OL and the magnification α of the intermediate magnification varying part VL (β×α). On the other hand, in the low magnification variation state, the lens group VL2 having a negative refractive power is disposed adjacent to the image side of the objective lens OL and the lens group VL1 having a positive refractive power is disposed on the image plane side, so that the synthesized magnification of the microscope optical system is determined as the product of the magnification β of the objective lens OL and the magnification 1/α of the intermediate magnification varying part VL (β×1/α).

The magnification β of the objective lens OL is represented as the ratio of the focal length of the imaging lens used in an actual microscope and the focal length of the microscope objective lens OL (β=(focal length of imaging lens)/(focal length of microscope objective lens OL).

Furthermore, it is preferable that the magnification a of the intermediate magnification varying part VL satisfies the following conditional expression (3):

$$1.25 \leq \alpha \leq 2.5. \quad (3)$$

Magnifications lower than the lower limit value of conditional expression (3) are not preferable since with such magnifications the magnification varying effect becomes small and the observation magnification will become too small. Magnifications higher than the upper limit value of conditional expression (3) are not preferably since with such magnifications the synthesized magnification of the microscope optical system as a whole becomes too high and it will be difficult to correct various aberrations.

In the microscope optical system according to the first aspect of the present invention, the intermediate magnification varying part VL is constructed in such a way that it can be rotated with an axis O orthogonal to the optical axis being the rotation axis. The axis O is in the vicinity of a substantially middle point of the on-axis distance of the outermost lens surface (i.e. the lens surface facing the objective lens OL in FIG. 1A) of the lens group VL1 having a positive refractive power and the outermost lens surface (i.e. the lens surface facing the image plane side) of the second lens group VL2.

With this structure, it is possible to arrange the lens group VL1 having a positive refractive power just after the image side of the objective lens OL in the high magnification variation state, and to arrange the lens group VL2 having a negative refractive power just after the image side of the objective lens OL in the low magnification variation state by rotating the optical system of the intermediate magnification varying part VL with the axis O being the rotation axis by 180 degrees.

By rotating the optical system of the intermediate magnification varying part VL by 180 degrees, it is possible to switch observation at a high magnification and observation at a low magnification without causing eccentricity in the barrel or displacement of the same focal point.

On the image plane side of the intermediate magnification varying part VL, there is provided a connecting portion that can be attached to and detached from the body of a microscope. In addition, a connecting portion may also be provided between the objective lens OL and the intermediate magnification varying portion VL so that the objective lens OL can be interchanged. In that case, objective lenses of various magnifications can be used.

In the above described structure, it is preferable that an iris diaphragm S (or an iris) be provided between the objective lens OL and the intermediate magnification varying part VL in the low magnification variation state in order to regulate marginal light fluxes of the objective lens OL.

The structure of the intermediate magnification varying part VL is not limited to the above-described rotatable structure but the same effect cay be realized by constructing the intermediate magnification varying part in such a way that an optical system is selectively inserted on and removed from the optical axis to switch a high magnification variation state and a low magnification variation state. Alternatively, an optical system having a zooming mechanism may be provided in the intermediate magnification varying part VL.

In the following, embodiments of the microscope optical system according to the present invention will be described.

(First Embodiment)

FIGS. 1A and 1B are diagrams showing the lens configuration of the first embodiment of the microscope optical system according to the present invention. FIG. 1A shows the high magnification variation state (2×) and FIG. 1B shows the low magnification variation state (0.5×).

In FIGS. 1A and 1B, the microscope optical system is composed of an objective lens OL and an intermediate magnification varying part VL disposed just after the image side end the objective lens OL.

The objective lens OL is composed of a first lens group G1 having a positive refractive power and a second lens group G2 having a negative refractive power arranged in the mentioned order from the object side. The first lens group G1 is composed, in the following order from the object side, of positive meniscus lenses L1 and L2 with the concave surfaces facing the object side having positive refractive powers respectively, a cemented lens composed of a positive lens L3 having a double convex shape, a negative lens L4 having a double concave shape and a positive lens L5 having a double convex shape, and a cemented lens composed of a negative meniscus lens L6 with the convex surface facing the object side, a positive lens L7 having a double convex shape and a negative meniscus lens L8 with the concave surface facing the object side. The second lens group G2 is composed of a cemented lens composed, in the following order from the object side, of a positive lens L9 having a double convex shape and a negative lens L10 having a double concave shape.

The intermediate magnification varying part VL includes a lens group VL1 having a positive refractive power and a lens group VL2 having a negative refractive power. In the high magnification variation state with the magnification variation ratio of 2×, the lens group VL1 having a positive refractive power is disposed just after the image side of the objective lens OL and the lens group VL2 having a negative refractive power is disposed on the image plane I side. In the low magnification variation state with the magnification variation ratio of 0.5×, the intermediate magnification varying part VL is rotated by 180 degrees with the axis O of the magnification varying part being the rotation axis, so that the lens group VL2 having a negative refractive power is disposed just after the image side of the objective lens OL and the lens group VL1 having a positive refractive power is disposed on the image plane I side. In addition, in the low magnification variation state, an iris diaphragm S for regulating the marginal light fluxes is inserted between the objective lens OL and the intermediate magnification varying part VL.

Various values associated with the first embodiment are listed in Table 1. In the overall specifications presented in Table 1, f represents the focal length of the objective lens OL at infinity for the d-line (with the wavelength of 587.6 nm), NA represents the numerical aperture on the object side, $\beta$ represents the magnification, wd represents a working distance represented by the distance between the surface of the object and the vertex of the outermost lens surface at the most front side, $\alpha$ is the magnification of the intermediate magnification varying part, and the "synthesized magnification" represents the magnification resulting from the magnification of the objective lens OL and the magnification of the intermediate magnification varying part VL. In the lens data, the surface numbers refer to the lens surfaces in the order in which rays pass them, r represents the radius of curvature of each lens surface, d represents the distance between adjacent lens surfaces, nd represents the refractive index for the d-line, and vd represents the Abbe's number for the d-line. It is assumed that the refractive index of air is 1.000000, and that value is omitted in the tables.

For all of the values shown in the following, "mm" (millimeters) is generally used as the unit for the length such as the focal length f, the working distance wd, the radius of curvature r, and the surface distance d, unless otherwise specified. However, the values are not limited to those presented, since optical systems can be proportionally enlarged or reduced in their size without substantially changing their optical performances. In addition, the unit is not limited to millimeters, but other suitable units may also be used. In the low magnification variation state, the lens data of the objective lens portion OL and the value associated with the conditional expression are the same as the lens data and the value associated with the conditional expression in the high magnification variation state, and therefore those data are omitted in the table. The explanations of the signs presented above also apply to the other embodiments that will be described later. In addition, in the other embodiments also, the lens data and the values associated with the conditional expression in the low magnification variation state are the same as those in the high magnification variation state. Such data will be omitted in the other embodiments also.

TABLE 1

[High Magnification Variation State]
(Overall Specifications)
f = 10
NA = 0.65
$\beta$ = 20
wd = 4
$\alpha$ = 2
Synthesized Magnification = 40
(Lens Data)

| Surface Number | r | d | nd | vd | |
|---|---|---|---|---|---|
| 1 | ∞ | 0.17 | | | Cover Glass |
| 2 | ∞ | 5.1 | | | |
| 3 | −7.800 | 6.5 | 1.804 | 46.6 | |
| 4 | −9.4004 | 0.1 | | | |
| 5 | −22.997 | 4.2 | 1.6204 | 60.3 | |
| 6 | −14.498 | 0.2 | | | |
| 7 | 37.996 | 4.3 | 1.569 | 71.3 | |
| 8 | −37.996 | 1.8 | 1.6133 | 44.3 | |
| 9 | 19.29 | 8.4 | 1.4978 | 82.5 | |
| 10 | −23.34 | 0.1 | | | |
| 11 | 24.04 | 2 | 1.8466 | 23.8 | |
| 12 | 13.67 | 9 | 1.4978 | 82.5 | |
| 13 | −18.46 | 1.8 | 1.6133 | 44.3 | |
| 14 | 218.7 | 11.05 | | | |
| 15 | 42.003 | 5.5 | 1.8052 | 25.4 | |
| 16 | −18.48 | 1.7 | 1.6133 | 44.3 | |
| 17 | 13.51 | 10 | | | |
| 18 | 44.99 | 3 | 1.4875 | 70.2 | |
| 19 | ∞ | 0.2 | | | |
| 20 | 64.65 | 4 | 1.6024 | 60.3 | |
| 21 | −28.87 | 2 | 1.6200 | 36.3 | |
| 22 | 332.96 | 20 | | | |
| 23 | −44.99 | 3.5 | 1.8052 | 25.4 | |
| 24 | −14.09 | 2 | 1.744 | 44.8 | |
| 25 | 33.01 | ∞ | | | |

(Value Associated with Conditional Expression)
wd/f = 0.4
[Low Magnification Variation State]
(Overall Specifications)
f = 10
NA = 0.65
$\beta$ = 20
wd = 4
$\alpha$ = 0.5
Synthesized Magnification = 10
(Lens Data)

| Surface Number | r | d | nd | vd | |
|---|---|---|---|---|---|
| 17 | 13.51 | 5 | | | |
| 18 | ∞ | 5 | | | Iris Diaphragm S |
| 19 | −33.01 | 2 | 1.744 | 44.8 | |
| 20 | 14.09 | 3.5 | 1.8052 | 25.4 | |
| 21 | 44.99 | 20 | | | |
| 22 | −332.96 | 2 | 1.6200 | 36.3 | |
| 23 | 28.87 | 4 | 1.6024 | 60.3 | |

TABLE 1-continued

| 24 | −64.65 | 0.2 | | |
|---|---|---|---|---|
| 25 | ∞ | 3 | 1.4875 | 70.2 |
| 26 | −44.99 | ∞ | | |

Figure 2:
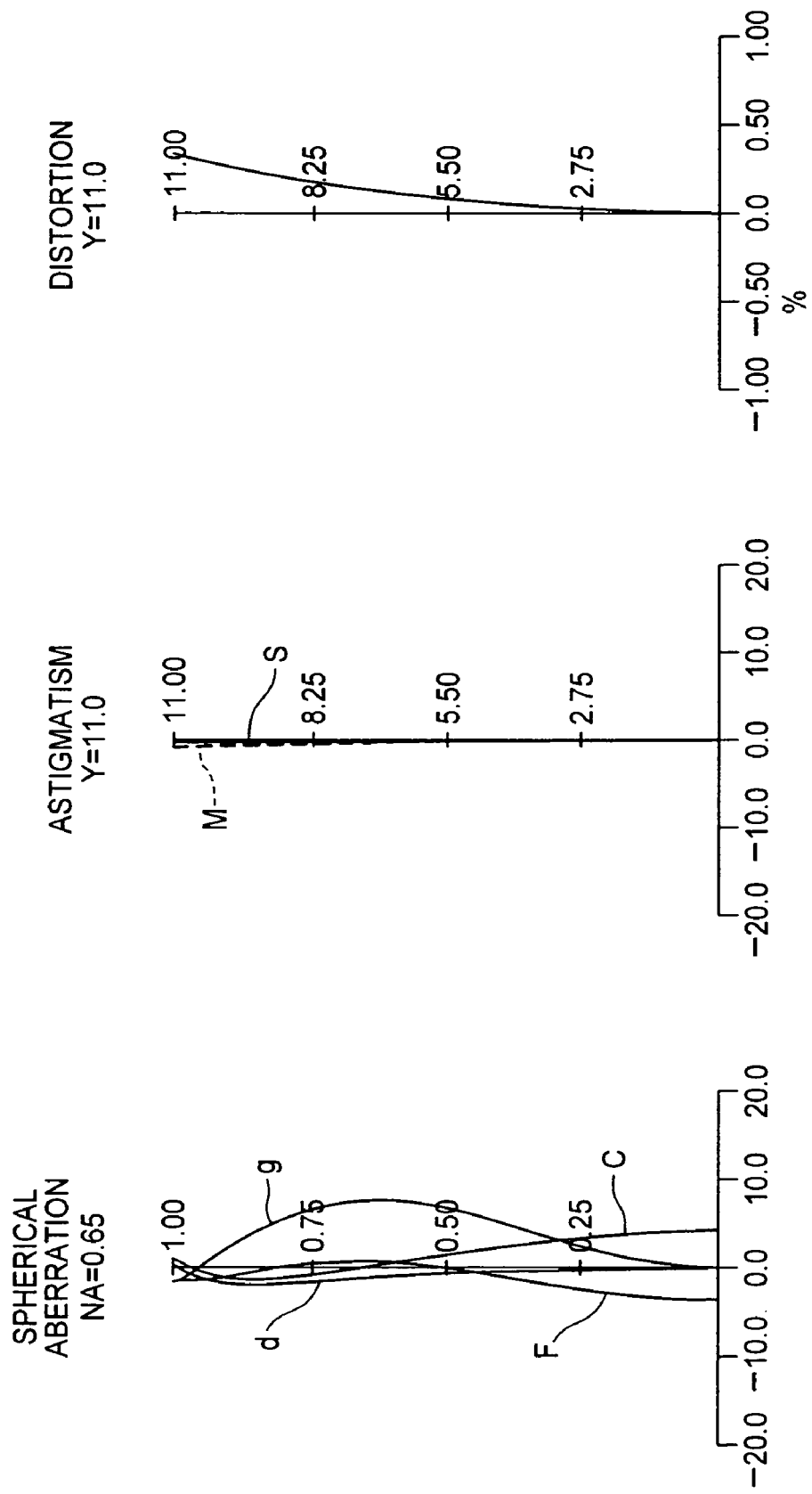
FIG. 2 shows various aberration curves of the microscope optical system according to the first embodiment in the high magnification variation state (2×).

FIGS. 2 and 3 show curves illustrating aberration characteristics of the microscope optical system according to the first embodiment. FIG. 2 shows the aberration characteristics under the high magnification variation state (2×), and FIG. 3 shows the aberration characteristics under the low magnification variation state (0.5×). In FIGS. 2 and 3, NA represents the numerical aperture and Y represents the image height. In the spherical aberration curves, C represents the c-line (with the wavelength of 656.3 nm), d represents the d-line (with the wavelength of 587.6 nm), F represents the F-line (with the wavelength of 486.1 nm), and g represents the g-line (with the wavelength of 435.6 nm). In the astigmatism curves, S represents the sagittal image surface for the d-line and M represents the meridional image surface for the d-line. The distortion curves are shown for the d-line. The aberration curves for all the embodiments are based on images formed using an imaging lens that will be described later. Throughout the aberration curves of all of the embodiments, the reference signs the same as those in the aberration curves for this embodiment will be used, and therefore redundant descriptions will be omitted.

As will be apparent from the aberration curves, the aberrations are favorably corrected.

(Second Embodiment)

FIGS. 4A and 4B are diagrams showing the lens configuration of the second embodiment of the microscope optical system according to the present invention. FIG. 4A shows the high magnification variation state (1.25×) and FIG. 4B shows the low magnification variation state (0.8×).

In FIGS. 4A and 4B, the microscope optical system is composed of an objective lens OL and an intermediate magnification varying part VL disposed just after the image side end of the objective lens OL.

The objective lens OL is composed of a first lens group G1 having a positive refractive power and a second lens group G2 having a negative refractive power arranged in the mentioned order from the object side. The first lens group G1 is composed, in the following order from the object side, of positive meniscus lenses L1 and L2 with the concave surfaces facing the object side having positive refractive powers respectively, a cemented lens composed of a positive lens L3 having a double convex shape, a negative lens L4 having a double concave shape and a positive lens L5 having a double convex shape, and a cemented lens composed of a negative meniscus lens L6 with the convex surface facing the object side, a positive lens L7 having a double convex shape and a negative meniscus lens L8 with the concave surface facing the object side. The second lens group G2 is composed of a cemented lens composed, in the following order from the object side, of a positive lens L9 having a double convex shape and a negative lens L10 having a double concave shape.

The intermediate magnification varying part VL includes a first lens group VL1 having a positive refractive power and a second lens group VL2 having a negative refractive power. In the high magnification variation state with the magnification variation ratio of 1.25×, the lens group VL1 having a positive refractive power is disposed just after the image side of the objective lens OL and the lens group VL2 having a negative refractive power is disposed on the image plane I side. In the low magnification variation state with the magnification variation ratio of 0.8×, the intermediate magnification varying part VL is rotated by 180 degrees with the axis O of the magnification varying part being the rotation axis, so that the lens group VL2 having a negative refractive power is disposed just after the image side of the objective lens OL and the lens group VL1 having a positive refractive power is disposed on the image plane I side. In addition, in the low magnification variation state, an iris diaphragm S for regulating the marginal light fluxes is inserted between the objective lens OL and the intermediate magnification varying part VL.

Various values associated with the second embodiment are listed in Table 2.

TABLE 2

[High Magnification Variation State]
(Overall Specifications)
f = 10
NA = 0.65
β = 20
wd = 4
α = 1.25
Synthesized Magnification = 25
(Lens Data)

| Surface Number | r | d | nd | νd | |
|---|---|---|---|---|---|
| 1 | ∞ | 0.17 | | | Cover Glass |
| 2 | ∞ | 5.1 | | | |
| 3 | −7.800 | 6.5 | 1.804 | 46.6 | |
| 4 | −9.4004 | 0.1 | | | |
| 5 | −22.997 | 4.2 | 1.6204 | 60.3 | |
| 6 | −14.498 | 0.2 | | | |
| 7 | 37.996 | 4.3 | 1.569 | 71.3 | |
| 8 | −37.996 | 1.8 | 1.6133 | 44.3 | |
| 9 | 19.29 | 8.4 | 1.4978 | 82.5 | |
| 10 | −23.34 | 0.1 | | | |
| 11 | 24.04 | 2 | 1.8466 | 23.8 | |
| 12 | 13.67 | 9 | 1.4978 | 82.5 | |
| 13 | −18.46 | 1.8 | 1.6133 | 44.3 | |
| 14 | 218.7 | 11.05 | | | |
| 15 | 42.003 | 5.5 | 1.8052 | 25.4 | |
| 16 | −18.48 | 1.7 | 1.6133 | 44.3 | |
| 17 | 13.51 | 10.0 | | | |
| 18 | 87.27 | 4 | 1.6204 | 60.1 | |
| 19 | −78.17 | 3 | 1.7400 | 28.2 | |
| 20 | −241.38 | 19 | | | |
| 21 | −134.2 | 3 | 1.7847 | 25.8 | |
| 22 | −61.01 | 2 | 1.6516 | 58.5 | |
| 23 | 92.56 | ∞ | | | |

(Value Associated with Conditional Expression)
wd/f = 0.4
[Low Magnification Variation State]
(Overall Specifications)
f = 10
NA = 0.65
β = 20
wd = 4
α = 0.8
Synthesized Magnification = 16
(Lens Data)

| Surface Number | r | d | nd | νd | |
|---|---|---|---|---|---|
| 17 | 13.51 | 5 | | | |
| 18 | ∞ | 5 | | | Iris Diaphragm S |
| 19 | −92.56 | 2 | 1.6516 | 58.5 | |
| 20 | 61.01 | 3 | 1.7847 | 25.8 | |
| 21 | 134.2 | 19 | | | |
| 22 | 241.38 | 3 | 1.7400 | 28.2 | |
| 23 | 78.17 | 3 | 1.6204 | 60.1 | |

TABLE 2-continued

| | | |
|---|---|---|
| 24 | −87.27 | ∞ |

(Third Embodiment)

Figures 5A, 5B:
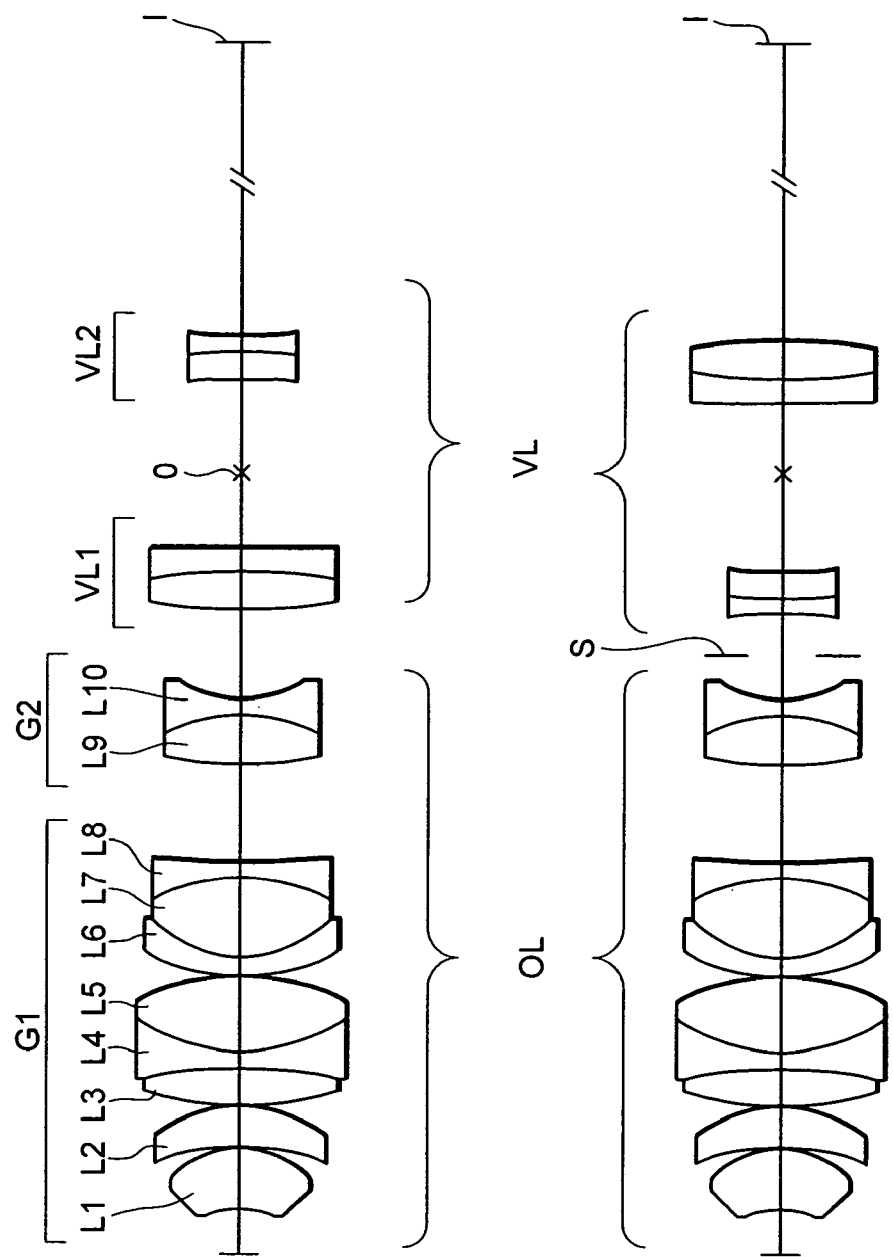

FIGS. 5A and 5B are diagrams showing the lens configuration of a third embodiment of the microscope optical system according to the present invention. FIG. 5A shows the high magnification variation state (1.5×) and FIG. 5B shows the low magnification variation state (0.66×).

In FIGS. 5A and 5B, the microscope optical system is composed of an objective lens OL and an intermediate magnification varying part VL disposed just after the image side end of the objective lens OL.

The objective lens OL is composed of a first lens group G1 having a positive refractive power and a second lens group G2 having a negative refractive power arranged in the mentioned order from the object side. The first lens group G1 is composed, in the following order from the object side, of positive meniscus lenses L1 and L2 with the concave surfaces facing the object side having positive refractive powers respectively, a cemented lens composed of a positive lens L3 having a double convex shape, a negative lens L4 having a double concave shape and a positive lens L5 having a double convex shape, and a cemented lens composed of a negative meniscus lens L6 with the convex surface facing the object side, a positive lens L7 having a double convex shape and a negative meniscus lens L8 with the concave surface facing the object side. The second lens group G2 is composed of a cemented lens composed, in the following order from the object side, of a positive lens L9 having a double convex shape and a negative lens L10 having a double concave shape.

The intermediate magnification varying part VL includes a lens group VL1 having a positive refractive power and a lens group VL2 having a negative refractive power. In the high magnification variation state with the magnification variation ratio of 1.5×, the lens group VL1 having a positive refractive power is disposed just after the image side of the objective lens OL and the lens group VL2 having a negative refractive power is disposed on the image plane I side. In the low magnification variation state with the magnification variation ratio of 0.66×, the intermediate magnification varying part VL is rotated by 180 degrees with the axis O of the magnification varying part being the rotation axis, so that the lens group VL2 having a negative refractive power is disposed just after the image side of the objective lens OL and the lens group VL1 having a positive refractive power is disposed on the image plane I side. In addition, in the low magnification variation state, an iris diaphragm S for regulating the marginal light fluxes is inserted between the objective lens OL and the intermediate magnification varying part VL.

Various values associated with the third embodiment are listed in Table 3.

TABLE 3

[High Magnification Variation State]
(Overall Specifications)
f = 10
NA = 0.65
β = 20
wd = 4
α = 1.5
Synthesized Magnification = 30

TABLE 3-continued (Lens Data)

| Surface Number | r | d | nd | νd | |
|---|---|---|---|---|---|
| 1 | ∞ | 0.17 | | | Cover Glass |
| 2 | ∞ | 5.1 | | | |
| 3 | −7.800 | 6.5 | 1.804 | 46.6 | |
| 4 | −9.4004 | 0.1 | | | |
| 5 | −22.997 | 4.2 | 1.6204 | 60.3 | |
| 6 | −14.498 | 0.2 | | | |
| 7 | 37.996 | 4.3 | 1.569 | 71.3 | |
| 8 | −37.996 | 1.8 | 1.6133 | 44.3 | |
| 9 | 19.29 | 8.4 | 1.4978 | 82.5 | |
| 10 | −23.34 | 0.1 | | | |
| 11 | 24.04 | 2 | 1.8466 | 23.8 | |
| 12 | 13.67 | 9 | 1.4978 | 82.5 | |
| 13 | −18.46 | 1.8 | 1.6133 | 44.3 | |
| 14 | 218.7 | 11.05 | | | |
| 15 | 42.003 | 5.5 | 1.8052 | 25.4 | |
| 16 | −18.48 | 1.7 | 1.6133 | 44.3 | |
| 17 | 13.51 | 10.0 | | | |
| 18 | 55.63 | 5 | 1.6204 | 60.1 | |
| 19 | −44.24 | 2.5 | 1.7552 | 27.6 | |
| 20 | −114.23 | 18.5 | | | |
| 21 | −69.38 | 3 | 1.7847 | 25.8 | |
| 22 | −26.01 | 2 | 1.7199 | 50.2 | |
| 23 | 56.66 | ∞ | | | |

(Value Associated with Conditional Expression)
wd/f = 0.4
[Low Magnification Variation State]
(Overall Specifications)
f = 10
NA = 0.65
β = 20
wd = 4
α = 0.66
Synthesized Magnification = 13.2
(Lens Data)

| Surface Number | r | d | nd | νd | |
|---|---|---|---|---|---|
| 17 | 13.51 | 5 | | | |
| 18 | ∞ | 5 | | | Iris Diaphragm S |
| 19 | −56.66 | 2 | 1.7199 | 50.2 | |
| 20 | 26.01 | 3 | 1.7847 | 25.8 | |
| 21 | 69.38 | 18.5 | | | |
| 22 | 114.23 | 2.5 | 1.7552 | 27.6 | |
| 23 | 44.24 | 5 | 1.6204 | 60.1 | |
| 24 | −55.63 | ∞ | | | |

(Fourth Embodiment)

Figures 6A, 6B:
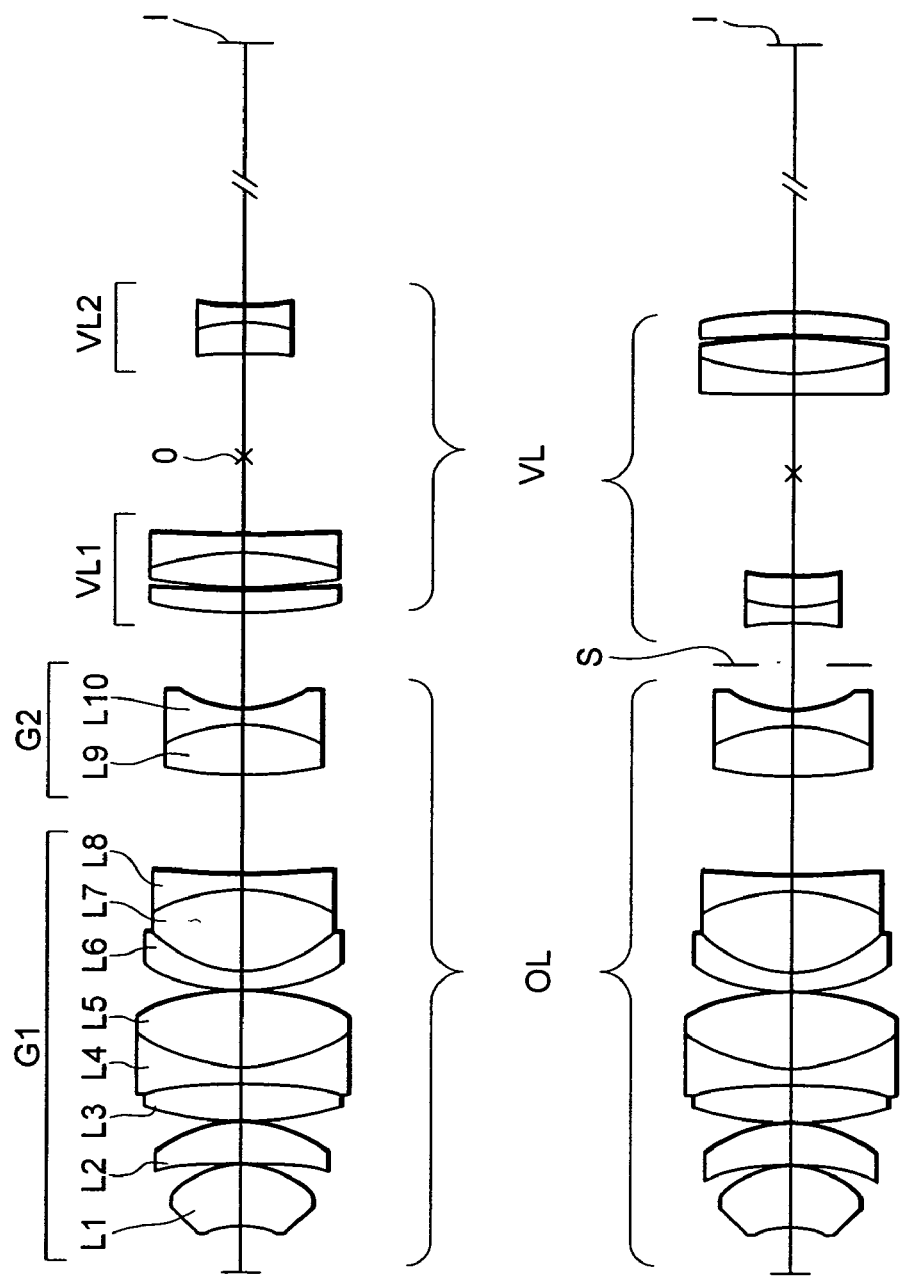

FIGS. 6A and 6B are diagrams showing the lens configuration of a fourth embodiment of the microscope optical system according to the present invention. FIG. 6A shows the high magnification variation state (2×) and FIG. 6B shows the low magnification variation state (0.5×).

In FIGS. 6A and 6B, the microscope optical system is composed of an objective lens OL and an intermediate magnification varying part VL disposed just after the image side end of the objective lens OL.

The objective lens OL is composed of a first lens group G1 having a positive refractive power and a second lens group G2 having a negative refractive power arranged in the mentioned order from the object side. The first lens group G1 is composed, in the following order from the object side, of positive meniscus lenses L1 and L2 with the concave surfaces facing the object side having positive refractive powers respectively, a cemented lens composed of a positive lens L3 having a double convex shape, a negative lens L4 having a double concave shape and a positive lens L5 having a double convex shape made of fluorite, and a cemented lens composed of a negative meniscus lens L6 with the convex surface facing the object side, a positive lens L7 having a double convex shape and a negative lens L8 having a double concave shape. The second lens group G2 is composed of a cemented lens composed, in the following order from the object side, of a positive lens L9 having a double convex shape and a negative lens L10 having a double concave shape.

The intermediate magnification varying part VL includes a lens group VL1 having a positive refractive power and a lens group VL2 having a negative refractive power. In the high magnification variation state with the magnification variation ratio of 2×, the lens group VL1 having a positive refractive power is disposed just after the image side of the objective lens OL and the lens group VL2 having a negative refractive power is disposed on the image plane I side. In the low magnification variation state with the magnification variation ratio of 0.5×, the intermediate magnification varying part VL is rotated by 180 degrees with the axis O of the magnification varying part being the rotation axis, so that the lens group VL2 having a negative refractive power is disposed just after the image side of the objective lens OL and the lens group VL1 having a positive refractive power is disposed on the image plane I side. In addition, in the low magnification variation state, an iris diaphragm S for regulating the marginal light fluxes is inserted between the objective lens OL and the intermediate magnification varying part VL.

Various values associated with the fourth embodiment are listed in Table 4.

TABLE 4

[High Magnification Variation State]
(Overall Specifications)
f = 10
NA = 0.65
β = 20
wd = 4
α = 2
Synthesized Magnification = 40
(Lens Data)

| Surface Number | r | d | nd | vd | |
|---|---|---|---|---|---|
| 1 | ∞ | 0.17 | | | Cover Glass |
| 2 | ∞ | 5 | | | |
| 3 | −7.603 | 7.4 | 1.804 | 46.6 | |
| 4 | −9.816 | 0.1 | | | |
| 5 | −46.767 | 4.3 | 1.569 | 71.3 | |
| 6 | −17.85 | 0.2 | | | |
| 7 | 41.984 | 4 | 1.569 | 71.3 | |
| 8 | −44.998 | 1.8 | 1.6126 | 44.4 | |
| 9 | 20.543 | 8.5 | 1.43385 | 95.25 | fluorite |
| 10 | −20.543 | 0.1 | | | |
| 11 | 22.761 | 2 | 1.8052 | 25.4 | |
| 12 | 13.612 | 9 | 1.4978 | 82.5 | |
| 13 | −18.458 | 1.8 | 1.6126 | 44.4 | |
| 14 | 117.68 | 10.9 | | | |
| 15 | 34.91 | 5.3 | 1.6889 | 31.1 | |
| 16 | −15.359 | 1.7 | 1.5688 | 56.3 | |
| 17 | 12.863 | 10 | | | |
| 18 | 44.99 | 3 | 1.4875 | 70.2 | |
| 19 | ∞ | 0.2 | | | |
| 20 | 64.65 | 4 | 1.6024 | 60.3 | |
| 21 | −28.87 | 2 | 1.6200 | 36.3 | |
| 22 | 332.96 | 20 | | | |
| 23 | −44.99 | 3.5 | 1.8052 | 25.4 | |
| 24 | −14.09 | 2 | 1.744 | 44.8 | |
| 25 | 33.01 | ∞ | | | |

(Value Associated with Conditional Expression)

TABLE 4-continued wd/f = 0.4
[Low Magnification Variation State]
(Overall Specifications)
f = 10
NA = 0.65
β = 20
wd = 4
α = 0.5
Synthesized Magnification = 10
(Lens Data)

| Surface Number | r | d | nd | vd | |
|---|---|---|---|---|---|
| 17 | 12.863 | 5 | | | |
| 18 | ∞ | 5 | | | Iris Diaphragm S |
| 19 | −33.01 | 2 | 1.744 | 44.8 | |
| 20 | 14.09 | 3.5 | 1.8052 | 25.4 | |
| 21 | 44.99 | 20 | | | |
| 22 | −332.96 | 2 | 1.6200 | 36.3 | |
| 23 | 28.87 | 4 | 1.6024 | 60.3 | |
| 24 | −64.65 | 0.2 | | | |
| 25 | ∞ | 3 | 1.4875 | 70.2 | |
| 26 | −44.99 | ∞ | | | |

(Fifth Embodiment)

Figures 7A, 7B:
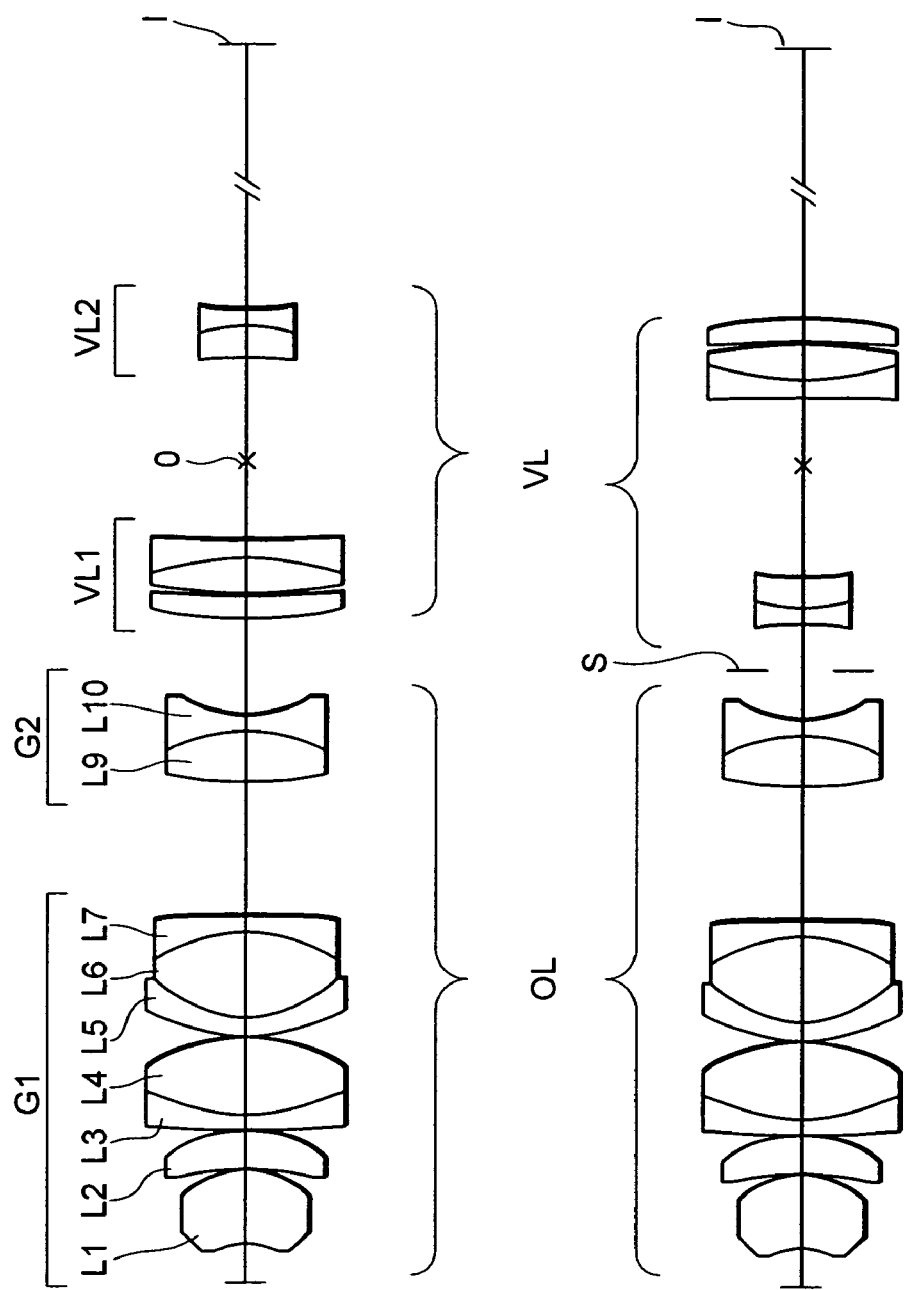

FIGS. 7A and 7B are diagrams showing the lens configuration of a fifth embodiment of the microscope optical system according to the present invention. FIG. 7A shows the high magnification variation state (2×) and FIG. 7B shows the low magnification variation state (0.5×).

In FIGS. 7A and 7B, the microscope optical system is composed of an objective lens OL and an intermediate magnification varying part VL disposed just after the image side end of the objective lens OL.

The objective lens OL is composed of a first lens group G1 having a positive refractive power and a second lens group G2 having a negative refractive power arranged in the mentioned order from the object side. The first lens group G1 is composed, in the following order from the object side, of positive meniscus lenses L1 and L2 with the concave surfaces facing the object side having positive refractive powers respectively, a cemented lens composed of a positive lens L3 having a plano-concave shape and a positive lens L4 having a double convex shape made of fluorite, and a cemented lens composed of a negative meniscus lens L5 with the convex surface facing the object side, a positive lens L6 having a double convex shape and a negative meniscus lens L7 with the concave surface facing the object side. The second lens group G2 is composed of a cemented lens composed, in the following order from the object side, of a positive lens L9 having a double convex shape and a negative lens L10 having a double concave shape.

The intermediate magnification varying part VL includes a lens group VL1 having a positive refractive power and a lens group VL2 having a negative refractive power. In the high magnification variation state with the magnification variation ratio of 2×, the lens group VL1 having a positive refractive power is disposed just after the image side of the objective lens OL and the lens group VL2 having a negative refractive power is disposed on the image plane I side. In the low magnification variation state with the magnification variation ratio of 0.5×, the intermediate magnification varying part VL is rotated by 180 degrees with the axis O of the magnification varying part being the rotation axis, so that the lens group VL2 having a negative refractive power is disposed just after the image side of the objective lens OL and the lens group VL1 having a positive refractive power is disposed on the image plane I side. In addition, in the low magnification variation state, an iris diaphragm S for regulating the marginal light fluxes is inserted between the objective lens OL and the intermediate magnification varying part VL.

Various values associated with the fifth embodiment are listed in Table 5.

TABLE 5

[High Magnification Variation State]
(Overall Specifications)
f = 10
NA = 0.6
β = 20
wd = 3.5
α = 2
Synthesized Magnification = 40
(Lens Data)

| Surface Number | r | d | nd | vd | |
|---|---|---|---|---|---|
| 1 | ∞ | 0.17 | | | Cover Glass |
| 2 | ∞ | 4.1 | | | |
| 3 | −8.301 | 8.3 | 1.7727 | 49.5 | |
| 4 | −10.602 | 0.1 | | | |
| 5 | −56.82 | 4.3 | 1.4978 | 82.5 | |
| 6 | −14.983 | 0.2 | | | |
| 7 | ∞ | 2 | 1.6126 | 44.4 | |
| 8 | 23.57 | 7 | 1.43385 | 95.25 | Fluorite |
| 9 | −18.137 | 0.1 | | | |
| 10 | 25.286 | 2 | 1.7552 | 27.6 | |
| 11 | 13.67 | 7.5 | 1.4978 | 82.5 | |
| 12 | −20.894 | 2 | 1.6126 | 44.4 | |
| 13 | −174.644 | 16.9 | | | |
| 14 | 42.654 | 5 | 1.7495 | 35.2 | |
| 15 | −16.113 | 2 | 1.5688 | 56.3 | |
| 16 | 12.655 | 10 | | | |
| 17 | 44.99 | 3 | 1.4875 | 70.2 | |
| 18 | ∞ | 0.2 | | | |
| 19 | 64.65 | 4 | 1.6024 | 60.3 | |
| 20 | −28.87 | 2 | 1.6200 | 36.3 | |
| 21 | 332.96 | 20 | | | |
| 22 | −44.99 | 3.5 | 1.8052 | 25.4 | |
| 23 | −14.09 | 2 | 1.744 | 44.8 | |
| 24 | 33.01 | ∞ | | | |

(Value Associated with Conditional Expression)
wd/f = 0.4
[Low Magnification Variation State]
(Overall Specifications)
f = 10
NA = 0.6
β = 20
wd = 3.5
α = 0.5
Synthesized Magnification = 10
(Lens Data)

| Surface Number | r | d | nd | vd | |
|---|---|---|---|---|---|
| 16 | 12.655 | 5 | | | |
| 17 | ∞ | 5 | | | Iris Diaphragm S |
| 18 | −33.01 | 2 | 1.744 | 44.8 | |
| 19 | 14.09 | 3.5 | 1.8052 | 25.4 | |
| 20 | 44.99 | 20 | | | |
| 21 | −332.96 | 2 | 1.6200 | 36.3 | |
| 22 | 28.87 | 4 | 1.6024 | 60.3 | |
| 23 | −64.65 | 0.2 | | | |
| 24 | ∞ | 3 | 1.4875 | 70.2 | |
| 25 | −44.99 | ∞ | | | |

(Sixth Embodiment)

Figures 8A, 8B:
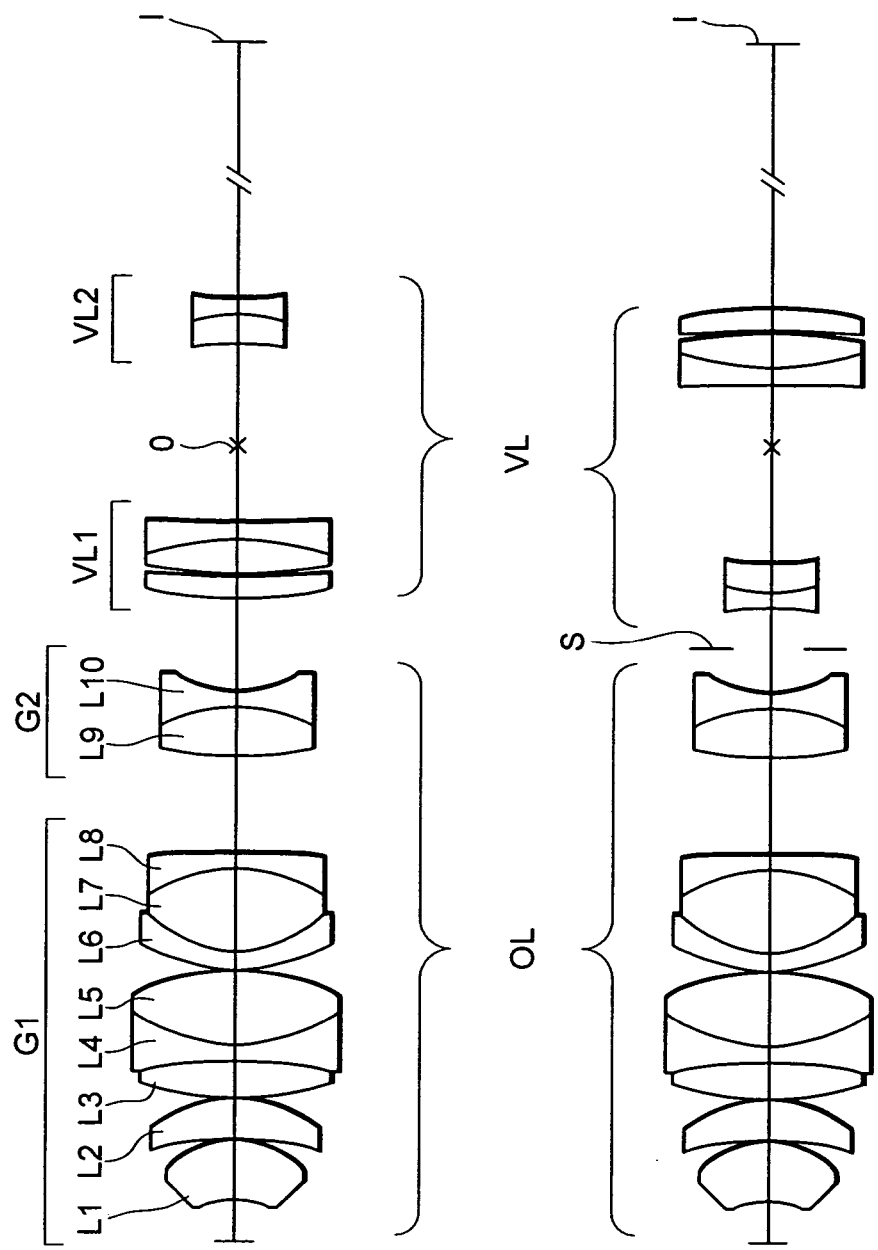

FIGS. 8A and 8B are diagrams showing the lens configuration of a sixth embodiment of the microscope optical system according to the present invention. FIG. 8A shows the high magnification variation state (2×) and FIG. 8B shows the low magnification variation state (0.5×).

In FIGS. 8A and 8B, the microscope optical system is composed of an objective lens OL and an intermediate magnification varying part VL disposed just after the image side end of the objective lens OL.

The objective lens OL is composed of a first lens group G1 having a positive refractive power and a second lens group G2 having a negative refractive power arranged in the mentioned order from the object side. The first lens group G1 is composed, in the following order from the object side, of positive meniscus lenses L1 and L2 with the concave surfaces facing the object side having positive refractive powers respectively, a cemented lens composed of a positive lens L3 having a double convex shape, a negative lens L4 having a double concave shape and a positive lens L5 having a double convex shape made of fluorite, and a cemented lens composed of a negative meniscus lens L6 with the convex surface facing the object side, a positive lens L7 having a double convex shape made of fluorite and a negative meniscus lens L8 with the concave surface facing the object side. The second lens group G2 is composed of a cemented lens composed, in the following order from the object side, of a positive lens L9 having a double convex shape and a negative lens L10 having a double concave shape.

The intermediate magnification varying part VL includes a lens group VL1 having a positive refractive power and a lens group VL2 having a negative refractive power. In the high magnification variation state with the magnification variation ratio of 2×, the lens group VL1 having a positive refractive power is disposed just after the image side of the objective lens OL and the lens group VL2 having a negative refractive power is disposed on the image plane I side. In the low magnification variation state with the magnification variation ratio of 0.5×, the intermediate magnification varying part VL is rotated by 180 degrees with the axis O of the magnification varying part being the rotation axis, so that the lens group VL2 having a negative refractive power is disposed just after the image side of the objective lens OL and the lens group VL1 having a positive refractive power is disposed on the image plane I side. In addition, in the low magnification variation state, an iris diaphragm S for regulating the marginal light fluxes is inserted between the objective lens OL and the intermediate magnification varying part VL.

Various values associated with the sixth embodiment are listed in Table 6.

TABLE 6

[High Magnification Variation State]
(Overall Specifications)
f = 10
NA = 0.65
β = 20
wd = 3.4
α = 2
Synthesized Magnification = 40
(Lens Data)

| Surface Number | r | d | nd | vd | |
|---|---|---|---|---|---|
| 1 | ∞ | 0.17 | | | Cover Glass |
| 2 | ∞ | 4.2 | | | |
| 3 | −7.603 | 7.4 | 1.804 | 46.6 | |
| 4 | −9.816 | 0.1 | | | |
| 5 | −26.52 | 4.3 | 1.569 | 71.3 | |
| 6 | −15.102 | 0.2 | | | |
| 7 | 37 | 4 | 1.569 | 71.3 | |

TABLE 6-continued

| | | | | | |
|---|---|---|---|---|---|
| 8 | −45 | 1.8 | 1.6126 | 44.4 | |
| 9 | 19.81 | 8.5 | 1.43385 | 95.25 | fluorite |
| 10 | −19.81 | 0.1 | | | |
| 11 | 23.666 | 2 | 1.8052 | 25.4 | |
| 12 | 14.392 | 9 | 1.43385 | 95.25 | fluorite |
| 13 | −18.5 | 1.8 | 1.6126 | 44.4 | |
| 14 | −68.199 | 10.9 | | | |
| 15 | 42.995 | 5.3 | 1.6889 | 31.1 | |
| 16 | −15.375 | 1.7 | 1.5688 | 56.3 | |
| 17 | 13.216 | 10 | | | |
| 18 | 44.99 | 3 | 1.4875 | 70.2 | |
| 19 | ∞ | 0.2 | | | |
| 20 | 64.65 | 4 | 1.6024 | 60.3 | |
| 21 | −28.87 | 2 | 1.6200 | 36.3 | |
| 22 | 332.96 | 20 | | | |
| 23 | −44.99 | 3.5 | 1.8052 | 25.4 | |
| 24 | −14.09 | 2 | 1.744 | 44.8 | |
| 25 | 33.01 | ∞ | | | |

(Value Associated with Conditional Expression)
wd/f = 0.34
[Low Magnification Variation State]
(Overall Specifications)
f = 10
NA = 0.65
β = 20
wd = 3.4
α = 0.5
Synthesized Magnification = 10
(Lens Data)

| Surface Number | r | d | nd | vd | |
|---|---|---|---|---|---|
| 17 | 13.216 | 5 | | | |
| 18 | ∞ | 5 | | | Iris Diaphragm S |
| 19 | −33.01 | 2 | 1.744 | 44.8 | |
| 20 | 14.09 | 3.5 | 1.8052 | 25.4 | |
| 21 | 44.99 | 20 | | | |
| 22 | −332.96 | 2 | 1.6200 | 36.3 | |
| 23 | 28.87 | 4 | 1.6024 | 60.3 | |
| 24 | −64.65 | 0.2 | | | |
| 25 | ∞ | 3 | 1.4875 | 70.2 | |
| 26 | −44.99 | ∞ | | | |

In the fourth to sixth embodiments, the intermediate magnification varying part VL may be replaced by the intermediate magnification VL same as those used in the second and third embodiment while attaining the same advantageous effects.

In the following, embodiments of a microscope objective lens in the form of an infinity optical system according to the second aspect of the present invention will be described.

An embodiment of the infinity optical system microscope objective lens according to the second aspect of the present invention includes a first lens group G1 and a second lens group G2 in the mentioned order from the object side. The first lens group G1 includes a positive meniscus lens L1 with the concave side facing the object side and one or more cemented lenses (i.e. at least one cemented lens). The first lens group G1 has a positive refracting power as a whole. At least one of the cemented lenses includes a positive double convex lens made of a material having an Abbe's number equal to or larger than 80. In addition, the infinity optical system microscope objective lens satisfies the following conditional expressions:

$$0.3 \leq wd/f \leq 0.45, \text{ and} \quad (11)$$

$$0.6 \leq NA, \quad (12)$$

where f represents the focal length of the infinity optical system microscope objective lens as a whole, wd represents the working distance of the infinity optical system microscope objective lens, and NA represents the numerical aperture of the infinity optical system microscope objective lens.

In the infinity optical system microscope objective lens according to the present invention, the lens surface closest to the object is designed to be concave so that the Petzval sum is made small. Thus, planarity of the image will be ensured.

The above-mentioned conditional expression (11) is a condition for defining the working distance wd of the infinity optical system microscope objective lens. Values lower than the lower limit value of that conditional expression are not preferable, since with such values the distance between the infinity optical system microscope objective lens and the specimen becomes too short and operationality will be deteriorated. Values larger than the upper limit value of that conditional expression are not preferable, since with such values planarity of the image and chromatic aberration will be deteriorated.

Conditional expression (12) is a condition for determining the numerical aperture NA of the infinity optical system microscope objective lens. If the numerical aperture NA is smaller than 0.6, desired resolving powers cannot be obtained.

In this system, a material having an Abbe's number equal to or larger than 80 is used for at least one of the cemented lenses. A lens made of a material having an Abbe's number smaller than 80 is not preferable since the chromatic aberration will be deteriorated. Materials having Abbe's numbers larger than 80 include fluorite etc.

(Embodiments)

Figure 17:
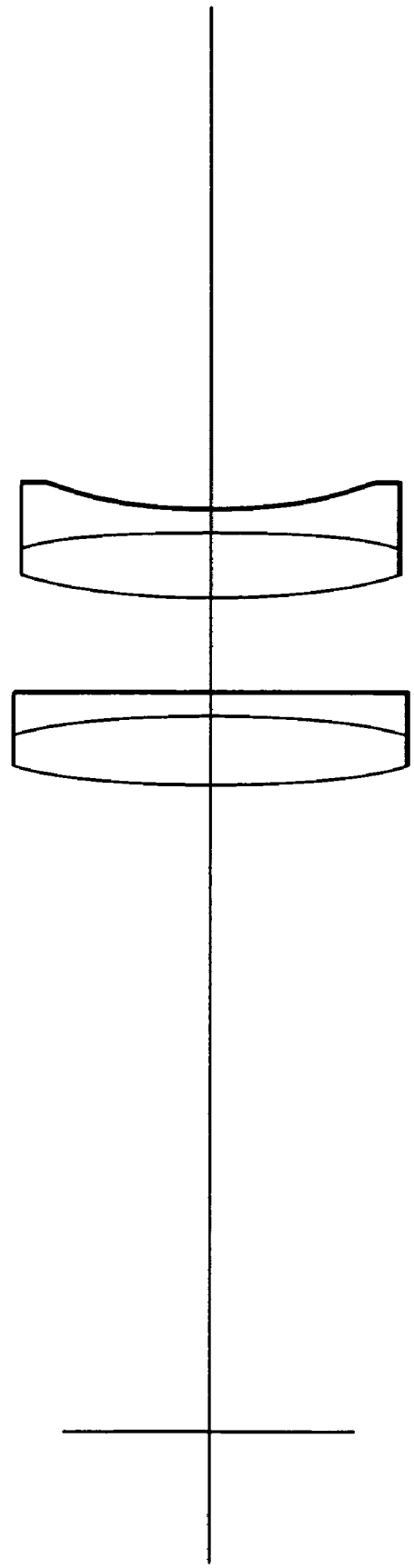
FIG. 17 is a diagram showing the lens configuration of an imaging lens used in each of the aforementioned embodiments.

In the following, embodiments of the infinity optical system microscope objective lens according to the present invention will be described with reference to accompanying drawings. All of the following embodiments are designed as infinity optical systems. When an infinity optical system objective lens according to any one of the embodiments is actually used as an objective lens in a microscope, an imaging lens, for example, as shown in FIG. 17 is to be provided on the image side of the objective lens. The details of the imaging lens will be described later. In the following embodiments, the magnification of the objective lens is 20×. The magnification β of an infinity optical system microscope objective lens is represented as the ratio of the focal length of the imaging lens actually used in the microscope and the focal length of the microscope objective lens (namely, β=(focal length of imaging lens)/(focal length of microscope objective lens)).

Figure 9:
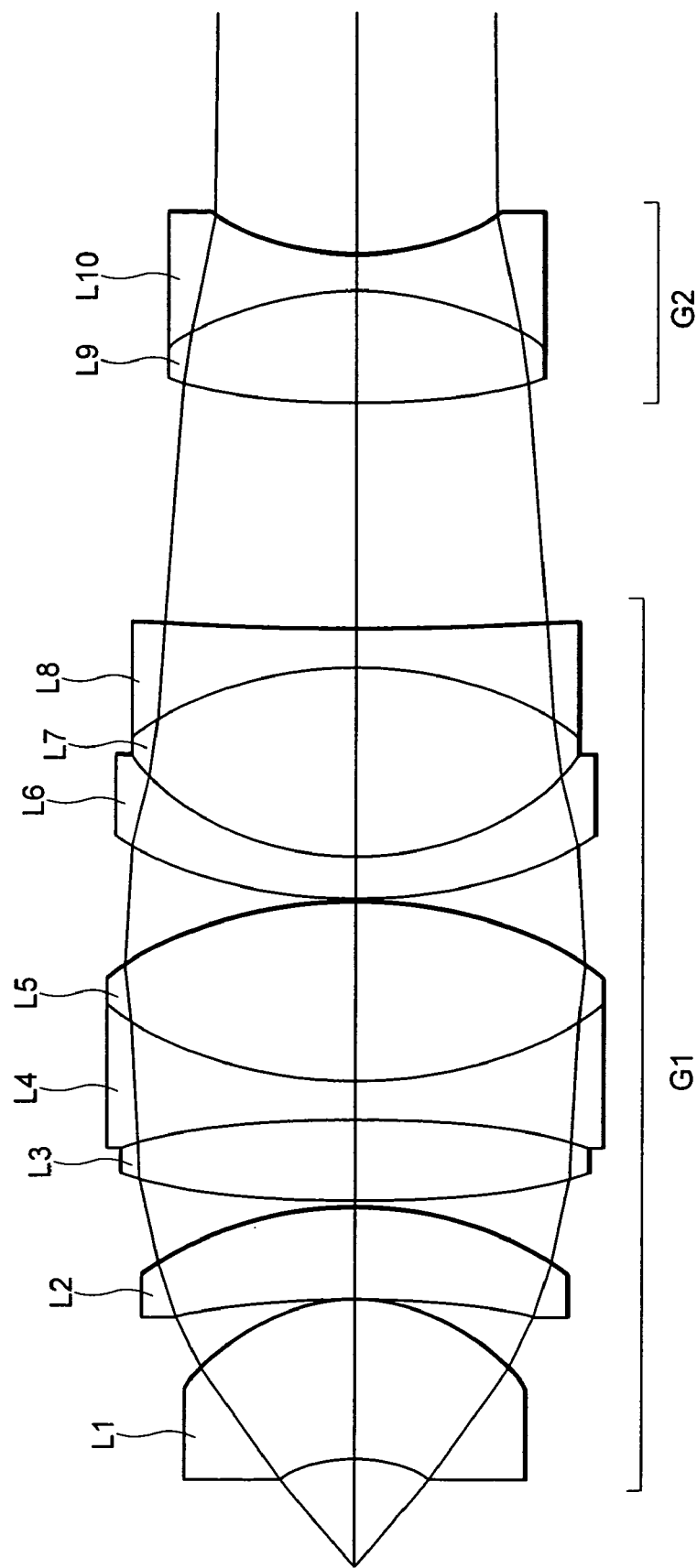
FIG. 9 is a diagram showing the lens configuration of an infinity optical system microscope objective lens according to a seventh embodiment of the present invention.

FIG. 9 is a diagram showing the lens configuration of an infinity optical system microscope objective lens according to the seventh embodiment of the present invention. The infinity optical system microscope objective lens is composed of a first lens group G1 having a positive refractive power and a second lens group G2 having a negative refractive power arranged in the mentioned order from the object side. The first lens group G1 is composed, in the following order from the object side, of positive meniscus lenses L1 and L2 with the concave surfaces facing the object side having positive refractive powers respectively, a cemented lens composed of a positive lens L3 having a double convex shape, a negative lens L4 having a double concave shape and a positive lens L5 having a double convex shape made of fluorite, and a cemented lens composed of a negative meniscus lens L6 with the convex surface facing the object side, a positive lens L7 having a double convex shape and a negative lens L8 having a double concave shape. The second lens group G2 is composed of a cemented lens composed, in the following order from the object side, of a positive lens L9 having a double convex shape and a negative lens L10 having a double concave shape.

Various values associated with the seventh embodiment are listed in Table 7. In the overall specifications presented in Table 7, f represents the focal length of the infinity optical system microscope objective lens at infinity for the d-line (with the wavelength of 587.6 nm). Those are the specifications of the microscope objective lens itself independent from any imaging lens. In addition, NA represents the numerical aperture on the object side, β represents the magnification, and wd represents a working distance represented by the distance between the surface of the object and the vertex of the outermost lens surface at the most front side. In the lens data, the surface numbers refer to the lens surfaces in the order in which rays pass them, r represents the radius of curvature of each lens surface, d represents the distance between adjacent lens surfaces, nd represents the refractive index for the d-line, and v d represents the Abbe's number for the d-line. It is assumed that the refractive index of air is 1.000000, and that value is omitted in the tables.

TABLE 7

(Overall Specifications)
f = 10
NA = 0.65
β = 20
wd = 4
(Lens Data)

| Surface Number | r | d | nd | vd | |
|---|---|---|---|---|---|
| 1 | ∞ | 0.17 | | | Cover Glass |
| 2 | ∞ | 5 | | | |
| 3 | −7.603 | 7.4 | 1.804 | 46.6 | |
| 4 | −9.816 | 0.1 | | | |
| 5 | −46.767 | 4.3 | 1.569 | 71.3 | |
| 6 | −17.85 | 0.2 | | | |
| 7 | 41.984 | 4 | 1.569 | 71.3 | |
| 8 | −44.998 | 1.8 | 1.6126 | 44.4 | |
| 9 | 20.543 | 8.5 | 1.43385 | 95.25 | Fluorite |
| 10 | −20.543 | 0.1 | | | |
| 11 | 22.761 | 2 | 1.8052 | 25.4 | |
| 12 | 13.612 | 9 | 1.4978 | 82.5 | |
| 13 | −18.458 | 1.8 | 1.6126 | 44.4 | |
| 14 | 117.68 | 10.9 | | | |
| 15 | 34.91 | 5.3 | 1.6889 | 31.1 | |
| 16 | −15.359 | 1.7 | 1.5688 | 56.3 | |
| 17 | 12.863 | ∞ | | | |

(Value Associated with Conditional Expression)
wd/f = 0.4

Figure 10:
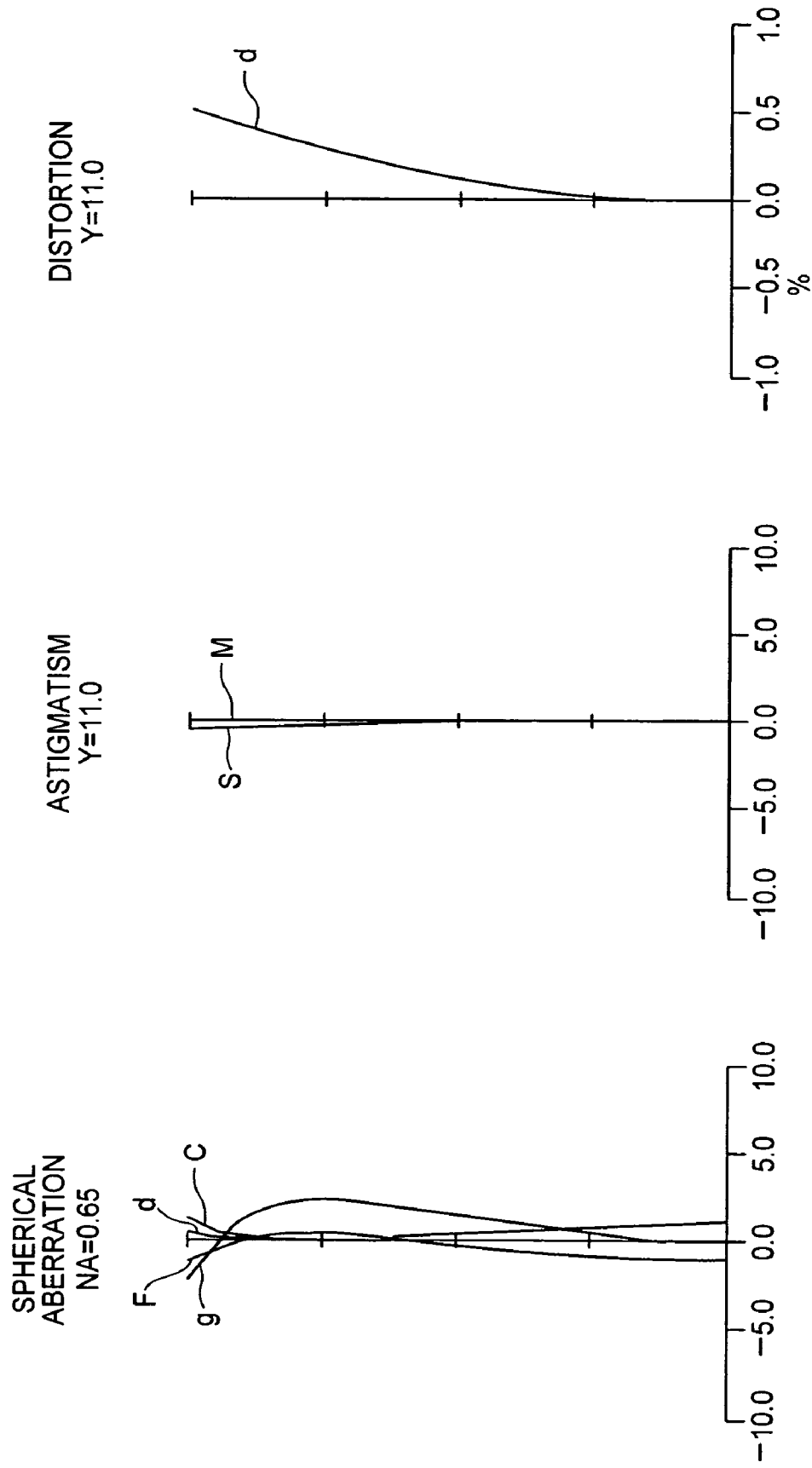
FIG. 10 shows various aberration curves in the seventh embodiment.

FIG. 10 shows curves illustrating aberration characteristics of the infinity optical system microscope objective lens according to the seventh embodiment. In the aberration curves, NA represents the numerical aperture and Y represents the image height. In the spherical aberration curves, C represents the c-line (with the wavelength of 656.3 nm), d represents the d-line (with the wavelength of 587.6 nm), F represents the F-line (with the wavelength of 486.1 nm), and g represents the g-line (with the wavelength of 435.6 nm). In the astigmatism curves, broken line S represents the sagittal image surface for the d-line and solid line M represents the meridional image surface for the d-line. The distortion curve is shown for the d-line.

As will be apparent from the aberration curves, the aberrations are favorably corrected.

(Eighth Embodiment)

Figure 11:
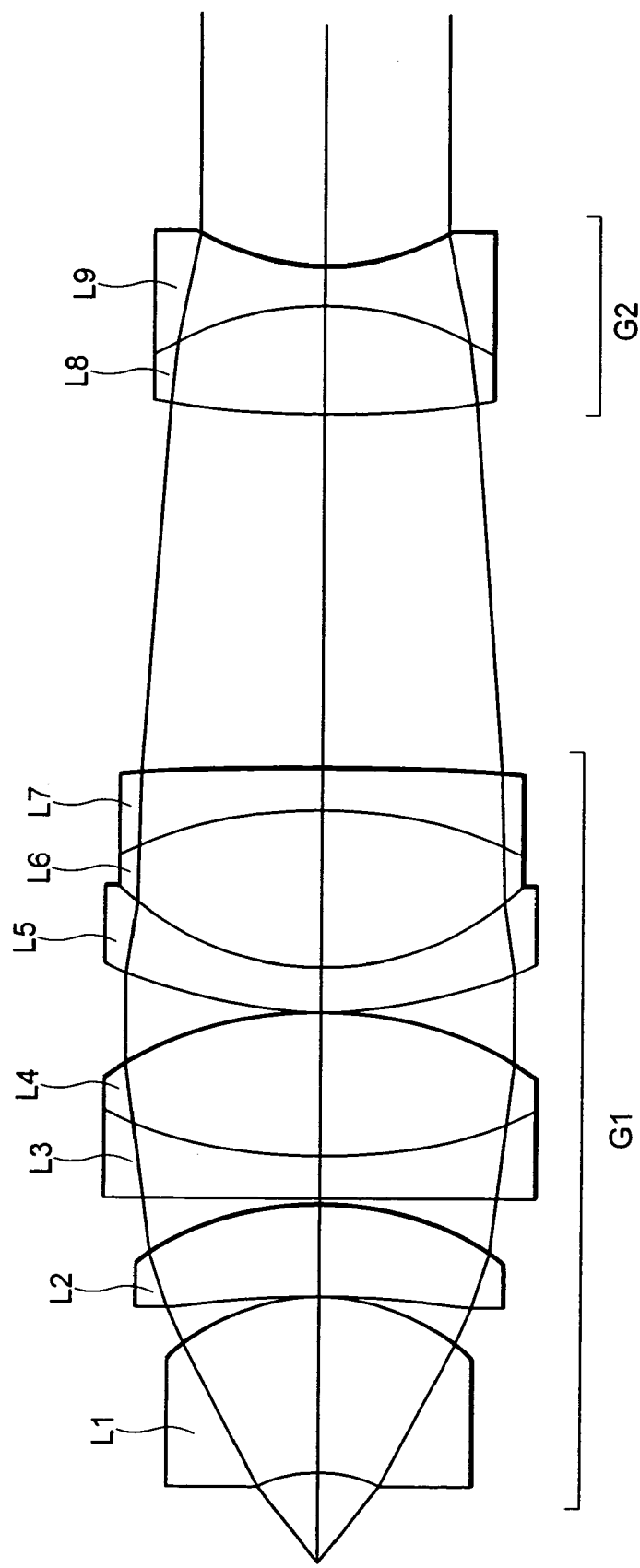
FIG. 11 is a diagram showing the lens configuration of an infinity optical system microscope objective lens according to an eighth embodiment of the present invention.

FIG. 11 is a diagram showing the lens configuration of an infinity optical system microscope objective lens according to the eighth embodiment of the present invention. The infinity optical system microscope objective lens is composed of a first lens group G1 having a positive refractive power and a second lens group G2 having a negative refractive power arranged in the mentioned order from the object side. The first lens group G1 is composed, in the following order from the object side, of positive meniscus lenses L1 and L2 with the concave surfaces facing the object side having positive refractive powers respectively, a cemented lens composed of a positive lens L3 having a plano-concave shape and a positive lens L4 having a double convex shape made of fluorite, and a cemented lens composed of a negative meniscus lens L5 with the convex surface facing the object side, a positive lens L6 having a double convex shape and a negative meniscus lens L7 with the concave surface facing the object side. The second lens group G2 is composed of a cemented lens composed, in the following order from the object side, of a positive lens L8 having a double convex shape and a negative lens L9 having a double concave shape.

Various values associated with the eighth embodiment are listed in Table 8.

TABLE 8

(Overall Specifications)
f = 10
NA = 0.6
β = 20
wd = 3.5
(Lens Data)

| Surface Number | r | d | nd | vd | |
|---|---|---|---|---|---|
| 1 | ∞ | 0.17 | | | Cover Glass |
| 2 | ∞ | 4.1 | | | |
| 3 | −8.301 | 8.3 | 1.7727 | 49.5 | |
| 4 | −10.602 | 0.1 | | | |
| 5 | −56.82 | 4.3 | 1.4978 | 82.5 | |
| 6 | −14.983 | 0.2 | | | |
| 7 | ∞ | 2 | 1.6126 | 44.4 | |
| 8 | 23.57 | 7 | 1.43385 | 95.25 | Fluorite |
| 9 | −18.137 | 0.1 | | | |
| 10 | 25.286 | 2 | 1.7552 | 27.6 | |
| 11 | 13.67 | 7.5 | 1.4978 | 82.5 | |
| 12 | −20.894 | 2 | 1.6126 | 44.4 | |
| 13 | −174.644 | 16.9 | | | |
| 14 | 42.654 | 5 | 1.7495 | 35.2 | |
| 15 | −16.113 | 2 | 1.5688 | 56.3 | |
| 16 | 12.655 | ∞ | | | |

(Value Associated with Conditional Expression)
wd/f = 0.4

Figure 12:
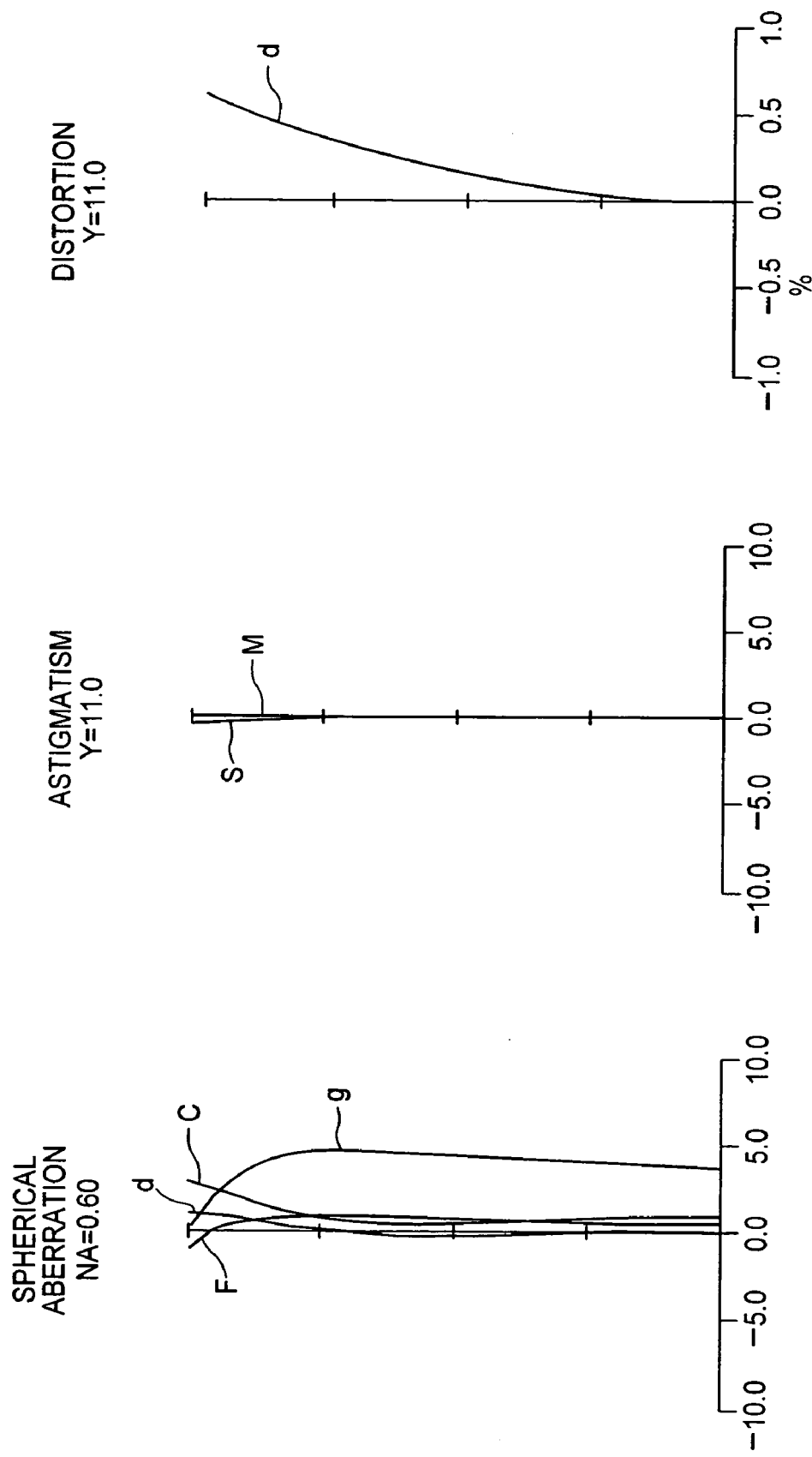
FIG. 12 shows various aberration curves in the eighth embodiment.

FIG. 12 shows curves illustrating aberration characteristics of the infinity optical system microscope objective lens according to the eighth embodiment. As will be apparent from the aberration curves, the aberrations are favorably corrected.

(Ninth Embodiment)

Figure 13:
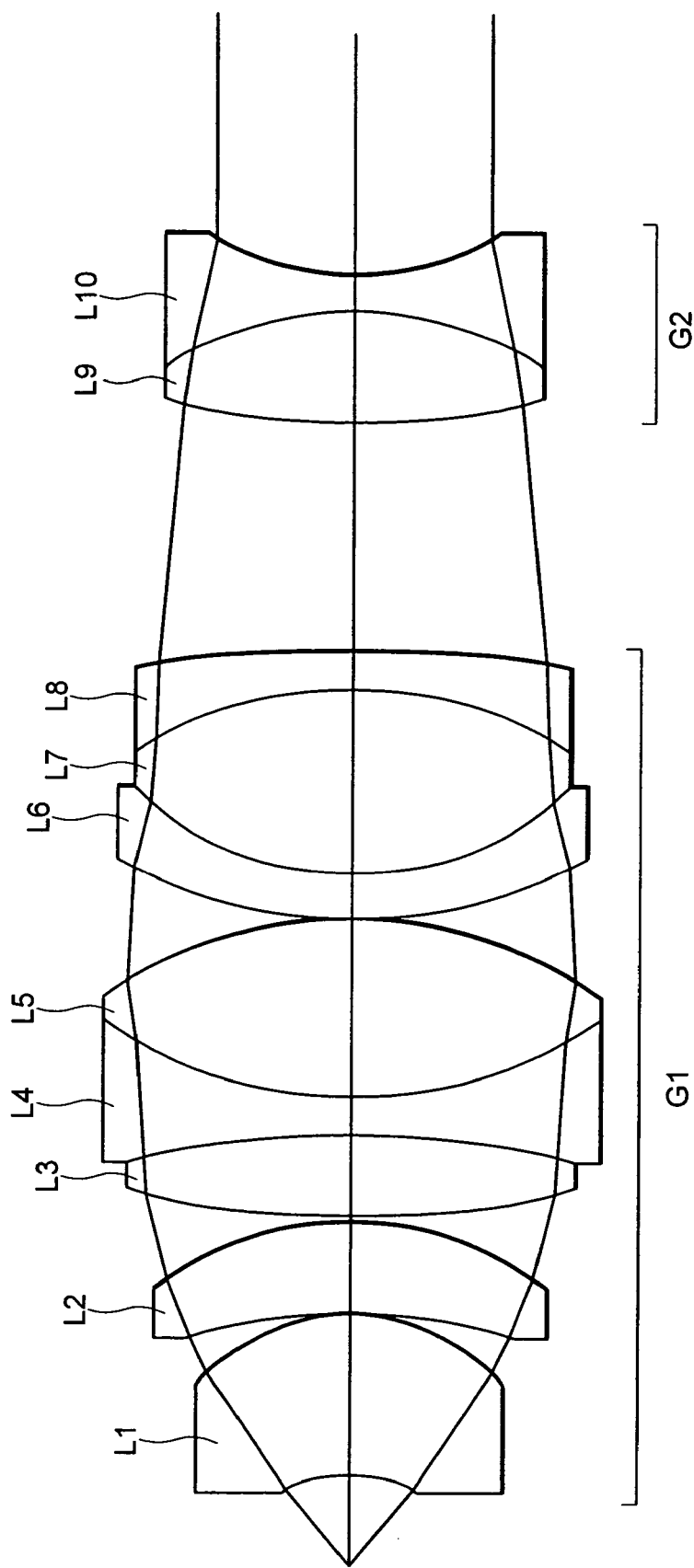
FIG. 13 is a diagram showing the lens configuration of an infinity optical system microscope objective lens according to a ninth embodiment of the present invention.

FIG. 13 is a diagram showing the lens configuration of an infinity optical system microscope objective lens according to the ninth embodiment of the present invention. The infinity optical system microscope objective lens is composed of a first lens group G1 having a positive refractive power and a second lens group G2 having a negative refractive power arranged in the mentioned order from the object side. The first lens group G1 is composed, in the following order from the object side, of positive meniscus lenses L1 and L2 with the concave surfaces facing the object side having positive refractive powers respectively, a cemented lens composed of a positive lens L3 having a double convex shape, a negative lens L4 having a double concave shape and a positive lens L5 having a double convex shape made of fluorite, and a cemented lens composed of a negative meniscus lens L6 with the convex surface facing the object side, a positive lens L7 having a double convex shape made of fluorite and a negative meniscus lens L8 with the concave surface facing the object side. The second lens group G2 is composed of a cemented lens composed, in the following order from the object side, of a positive lens L9 having a double convex shape and a negative lens L10 having a double concave shape.

Various values associated with the ninth embodiment are listed in Table 9.

TABLE 9

(Overall Specifications)
f = 10
NA = 0.65
β = 20
wd = 3.4
(Lens Data)

| Surface Number | r | d | nd | νd | |
|---|---|---|---|---|---|
| 1 | ∞ | 0.17 | | | Cover Glass |
| 2 | ∞ | 4.2 | | | |
| 3 | −7.603 | 7.4 | 1.804 | 46.6 | |
| 4 | −9.816 | 0.1 | | | |
| 5 | −26.52 | 4.3 | 1.569 | 71.3 | |
| 6 | −15.102 | 0.2 | | | |
| 7 | 37.4 | 1.569 | 71.3 | | |
| 8 | −45 | 1.8 | 1.6126 | 44.4 | |
| 9 | 19.81 | 8.5 | 1.43385 | 95.25 | Fluorite |
| 10 | −19.81 | 0.1 | | | |
| 11 | 23.666 | 2 | 1.8052 | 25.4 | |
| 12 | 14.392 | 9 | 1.43385 | 95.25 | Fluorite |
| 13 | −18.5 | 1.8 | 1.6126 | 44.4 | |
| 14 | −68.199 | 10.9 | | | |
| 15 | 42.995 | 5.3 | 1.6889 | 31.1 | |
| 16 | −15.375 | 1.7 | 1.5688 | 56.3 | |
| 17 | 13.216 | ∞ | | | |

(Value Associated with Conditional Expression)
wd/f = 0.34

Figure 14:
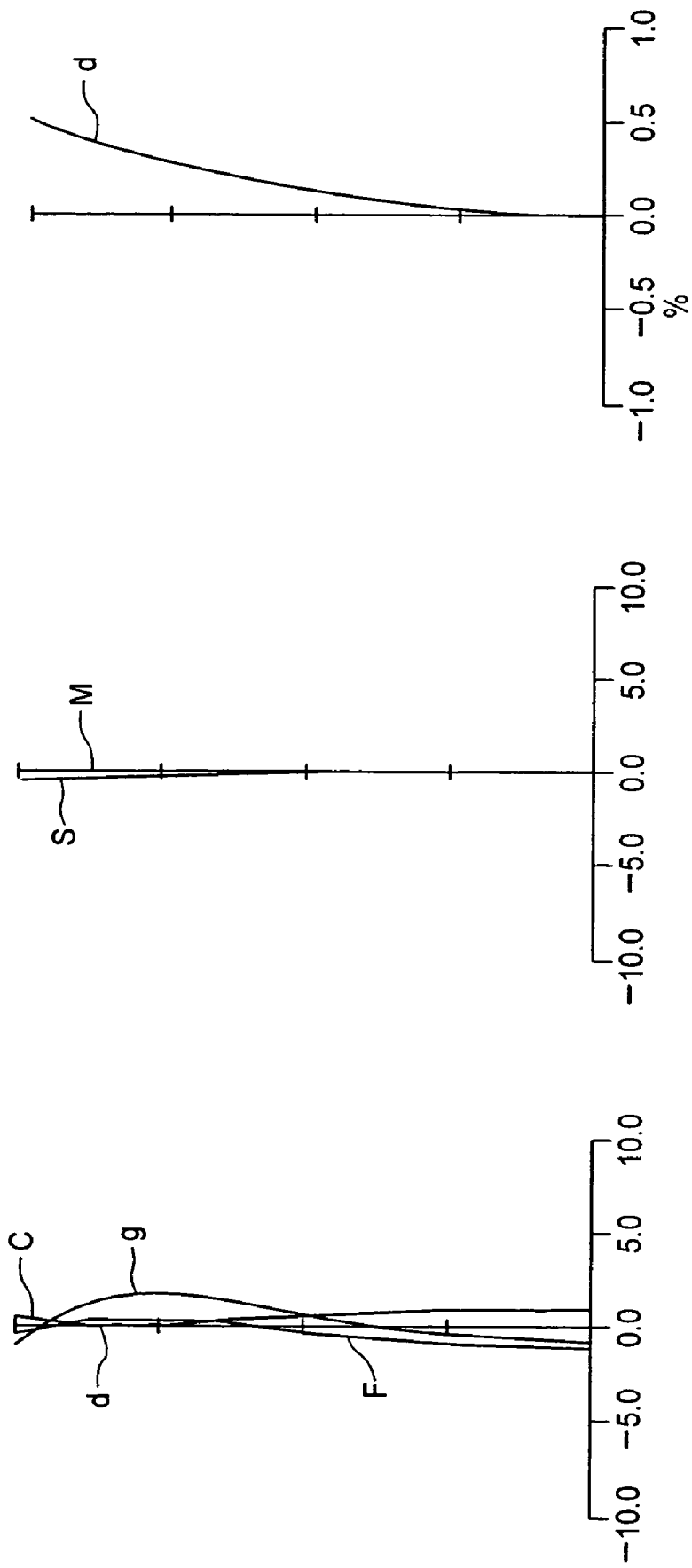
FIG. 14 shows various aberration curves in the ninth embodiment.

FIG. 14 shows curves illustrating aberration characteristics of the infinity optical system microscope objective lens according to the ninth embodiment. As will be apparent from the aberration curves, the aberrations are favorably corrected.

(Tenth Embodiment)

Figure 15:
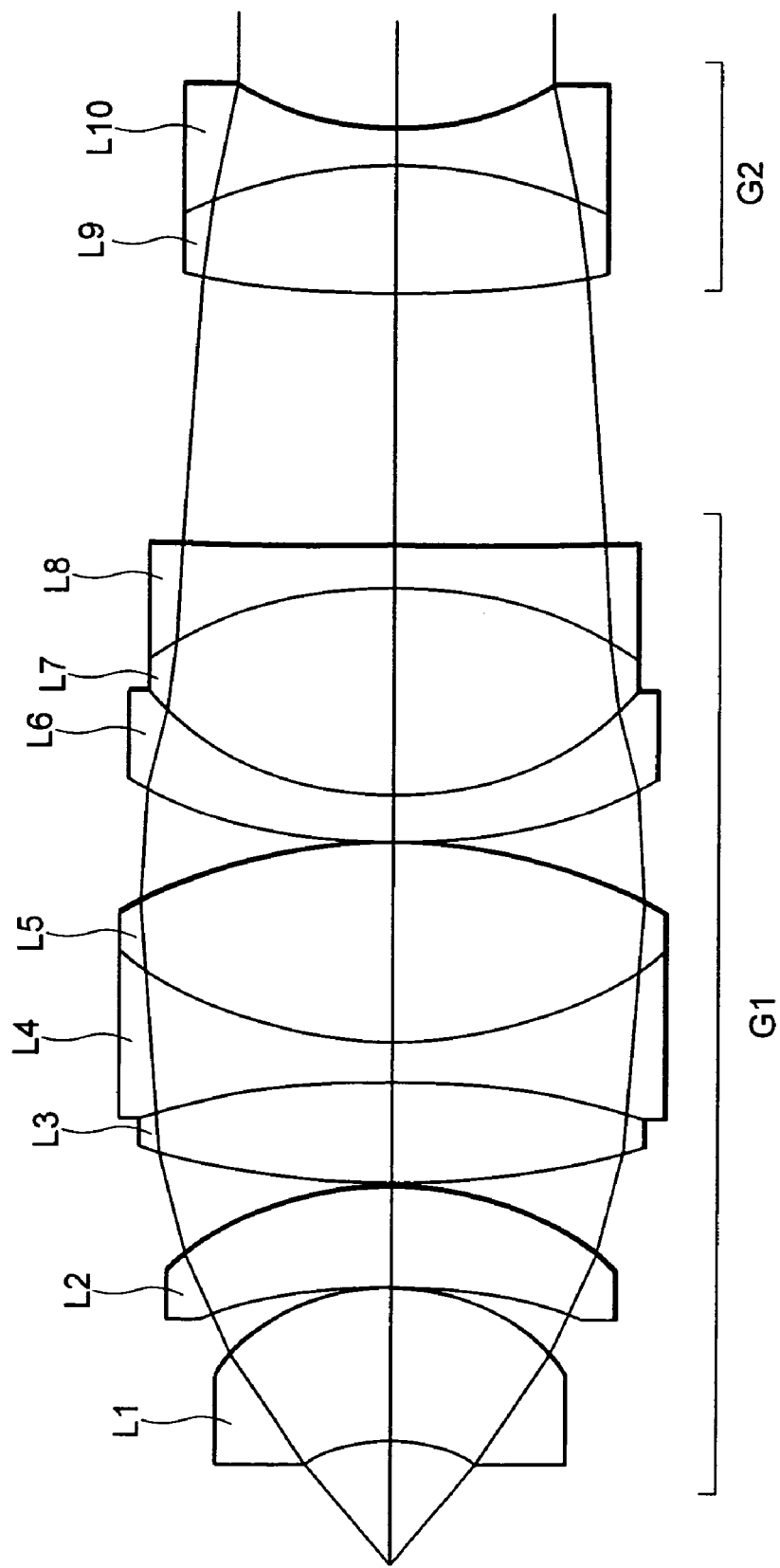
FIG. 15 is a diagram showing the lens configuration of an infinity optical system microscope objective lens according to a tenth embodiment of the present invention.

FIG. 15 is a diagram showing the lens configuration of an infinity optical system microscope objective lens according to the tenth embodiment of the present invention. The infinity optical system microscope objective lens is composed of a first lens group G1 having a positive refractive power and a second lens group G2 having a negative refractive power arranged in the mentioned order from the object side. The first lens group G1 is composed, in the following order from the object side, of positive meniscus lenses L1 and L2 with the concave surfaces facing the object side having positive refractive powers respectively, a cemented lens composed of a positive lens L3 having a double convex shape, a negative lens L4 having a double concave shape and a positive lens L5 having a double convex shape, and a cemented lens composed of a negative meniscus lens L6 with the convex surface facing the object side, a positive lens L7 having a double convex shape and a negative meniscus lens L8 with the concave surface facing the object side. The second lens group G2 is composed of a cemented lens composed, in the following order from the object side, of a positive lens L9 having a double convex shape and a negative lens L10 having a double concave shape.

Various values associated with the tenth embodiment are listed in Table 10.

TABLE 10

(Overall Specifications)
f = 10
NA = 0.65
β = 20
wd = 4
(Lens Data)

| Surface Number | r | d | nd | νd | |
|---|---|---|---|---|---|
| 1 | ∞ | 0.17 | | | Cover Glass |
| 2 | ∞ | 5.1 | | | |
| 3 | −7.800 | 6.5 | 1.804 | 46.6 | |
| 4 | −9.4004 | 0.1 | | | |
| 5 | −22.997 | 4.2 | 1.6204 | 60.3 | |
| 6 | −14.498 | 0.2 | | | |
| 7 | 37.996 | 4.3 | 1.569 | 71.3 | |
| 8 | −37.996 | 1.8 | 1.6133 | 44.3 | |
| 9 | 19.29 | 8.4 | 1.4978 | 82.5 | |
| 10 | −23.34 | 0.1 | | | |
| 11 | 24.04 | 2 | 1.8466 | 23.8 | |
| 12 | 13.67 | 9 | 1.4978 | 82.5 | |
| 13 | −18.46 | 1.8 | 1.6133 | 44.3 | |
| 14 | 218.7 | 11.05 | | | |
| 15 | 42.003 | 5.5 | 1.8052 | 25.4 | |
| 16 | −18.48 | 1.7 | 1.6133 | 44.3 | |
| 17 | 13.51 | ∞ | | | |

(Value Associated with Conditional Expression)
wd/f = 0.4

Figure 16:
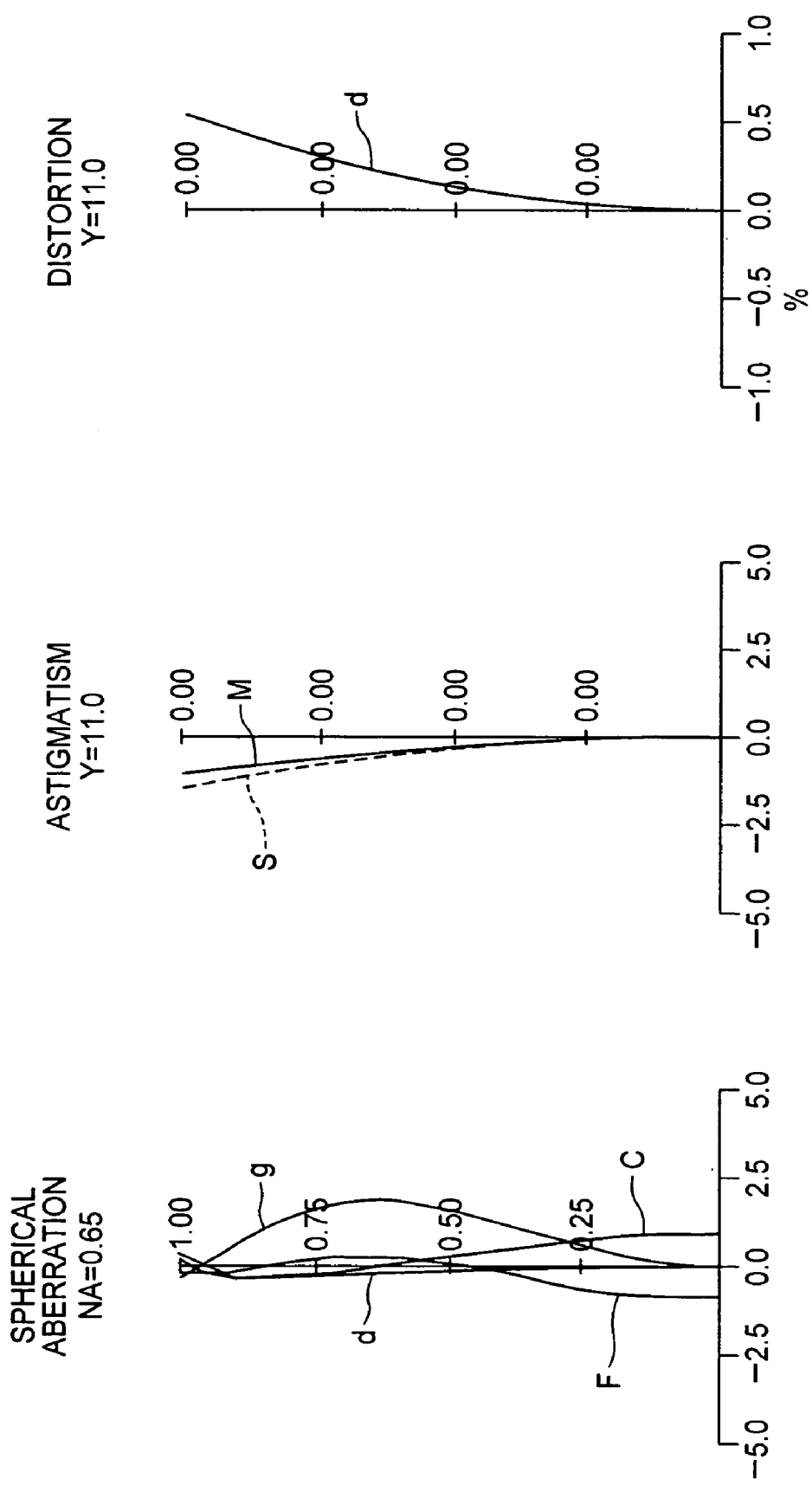
FIG. 16 shows various aberration curves in the tenth embodiment.

FIG. 16 shows curves illustrating aberration characteristics of the infinity optical system microscope objective lens according to the tenth embodiment. As will be apparent from the aberration curves, the aberrations are favorably corrected.

FIG. 17 is a diagram showing the lens configuration of an imaging lens used in combination with each of the above-described embodiments. Various values associated with the imaging lens are listed in Table 11.

TABLE 11

(Overall Specifications)
f = 200
(Lens Data)

| Surface Number | r | d | nd | νd |
|---|---|---|---|---|
| 1 | 75.04 | 5.1 | 1.6228 | 57 |
| 2 | −75.04 | 2 | 1.7495 | 35.2 |
| 3 | 1600.5 | 7.5 | | |
| 4 | 50.26 | 5.1 | 1.6675 | 42 |
| 5 | −84.54 | 1.8 | 1.6126 | 44.4 |
| 6 | 39.91 | | | |

It should be understood that the infinity optical system microscope objective lens according to the present invention is not limited to the above-described embodiments, but changes and modifications can be made to them without departing from the scope of the invention.

What is claimed is:

1. A microscope optical system, comprising:
an objective lens; and
an intermediate magnification varying part disposed just after an image side of said objective lens to vary magnification of a sample observed through said objective lens,
wherein said intermediate magnification varying part includes a lens group having a positive refractive power and a lens group having a negative refractive power,
in a high magnification variation state, said lens group having a positive refractive power is disposed just after the image side of said objective lens, while in a low magnification variation state, said lens group having a negative refractive power is disposed just after the image side of said objective lens, and
said intermediate magnification varying part is constructed in such a way that its optical system is rotatable relative to an optical axis of said objective lens with an axis substantially orthogonal to said optical axis of said objective lens being a rotation axis.

2. A microscope optical system according to claim 1, wherein said microscope optical system is provided with a connecting portion on the image side of said intermediate magnification varying part and the microscope optical system can be connected with a body of a microscope by means of said connecting portion.

3. A microscope optical system according to claim 1, wherein a magnification of the intermediate magnification varying part in said high magnification variation state is $\alpha$ and a magnification thereof in said low magnification variation state is $1/\alpha$.

4. A microscope optical system according to claim 3, wherein said magnification $\alpha$ satisfies $1.25 \leq \alpha \leq 2.5$.

5. A microscope optical system according to claim 4, wherein said microscope optical system is provided with a connecting portion on the image side of said intermediate magnification varying part and the microscope optical system can be connected with a body of a microscope by means of said connecting portion.

6. A microscope optical system according to claim 3, where said microscope optical system is provide with a connecting portion on the image side of said intermediate magnification varying part and the microscope optical system can be connected with a body of a microscope by means of said connecting portion.

7. A microscope optical system according to claim 1, wherein an optical axis of said intermediate magnification varying part is aligned with said optical axis of said objective lens, and said intermediate magnification varying part is constructed to be rotated by 180 degrees about said rotation axis at a point on said optical axis of the intermediate magnification varying part to select one of said high magnification variation state and said low magnification variation state.

8. The microscope optical system of claim 1, wherein:
said lens group having a positive refractive power comprises a first lens group, and said lens group having a negative refractive power comprises a second lens group,
wherein in said high magnification variation state, said intermediate magnification varying part is set to a first state in which said first lens group is disposed just after the image side of said objective lens so that said microscope optical system is composed of said objective lens, said first lens group and said second lens group disposed in that order,
wherein in said low magnification variation state, said intermediate magnification varying part is set to a second state in which said second lens group is disposed just after the image side of said objective lens so that said microscope optical system is composed of said objective lens, said second lens group and said first lens group disposed in that order, and
wherein said intermediate magnification varying part is so constructed to be rotated by 180 degrees about a rotation axis substantially orthogonal to said optical axis of said objective lens so that said intermediate magnification varying part is set to one of said first state and said second state selectively.

9. A microscope optical system, comprising:
an objective lens; and
an intermediate magnification varying part disposed just after an image side of said objective lens to vary magnification of a sample observed through said objective lens,
wherein said intermediate magnification varying part is constructed in such a way that its optical system is rotatable relative to an optical axis of said objective lens with an axis substantially orthogonal to said optical axis of said objective lens being a rotation axis,
wherein said intermediate magnification varying part includes a first lens group having a positive refractive power and a second lens group having a negative refractive power,
wherein in said high magnification variation state, said intermediate magnification varying part is set to a first state in which said first lens group is disposed just after the image side of said objective lens so that said microscope optical system is composed of said objective lens, said first lens group and said second lens group disposed in that order,
wherein in said low magnification variation state, said intermediate magnification varying part is set to a second state in which said second lens group is disposed just after the image side of said objective lens so that said microscope optical system is composed of said objective lens, said second lens group and said first lens group disposed in that order, and
wherein said intermediate magnification varying part is so constructed to be rotated by 180 degrees about a rotation axis substantially orthogonal to said optical axis of said objective lens so that said intermediate magnification varying part is set to one of said first state and said second state selectively.

10. A microscope optical system according to claim 9, wherein said microscope optical system is provided with a connecting portion on the image side of said intermediate magnification varying part and the microscope optical system can be connected with a body of a microscope by means of said connecting portion.

11. A microscope optical system according to claim 9, wherein a magnification of the intermediate magnification varying part in said high magnification variation state is $\alpha$ and a magnification thereof in said low magnification variation state is $1/\alpha$.

12. A microscope optical system according to claim 11, wherein said magnification $\alpha$ satisfies $1.25 \leq \alpha \leq 2.5$.

13. A microscope optical system according to claim 9, wherein an optical axis of said intermediate magnification varying part is aligned with said optical axis of said objective lens, and said intermediate magnification varying part is constructed to be rotated by 180 degrees about said rotation axis at a point on said optical axis of the intermediate magnification varying part.

* * * * *